United States Patent
Armond et al.

(10) Patent No.: US 6,178,081 B1
(45) Date of Patent: *Jan. 23, 2001

(54) CONTROLLER FOR ELECTRIC PERMANENT CHUCK

(75) Inventors: Joseph A. Armond, Bartlett; Juanito T. Rodenas, Carol Stream, both of IL (US)

(73) Assignee: Electro-Matic Products Co., Chicago, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/151,392

(22) Filed: Sep. 10, 1998

(51) Int. Cl.⁷ ..................................... H01F 13/00
(52) U.S. Cl. ........................ 361/145; 361/149; 361/267
(58) Field of Search ................... 361/143–151, 361/267; 335/289–295

(56) References Cited

U.S. PATENT DOCUMENTS

| | | |
|---|---|---|
| 2,544,366 | 3/1951 | Storm . |
| 3,579,053 | 5/1971 | Litwin . |
| 3,619,729 | 11/1971 | Litwin . |
| 4,402,032 | 8/1983 | Wilterdink . |
| 4,467,388 | 8/1984 | Thoe . |
| 4,771,358 | 9/1988 | Millner . |
| 4,843,516 | 6/1989 | Arnond et al. . |
| 4,873,605 | * 10/1989 | Drits et al. ........................ 361/143 |
| 4,887,184 | 12/1989 | Armond . |
| 5,267,119 | 11/1993 | Armond et al. . |
| 5,331,269 | 7/1994 | Armond et al. . |

FOREIGN PATENT DOCUMENTS

| | | |
|---|---|---|
| 819898 | 6/1958 | (GB) . |
| 5116083 | * 5/1993 | (JP) ................................ B25J/15/08 |

* cited by examiner

Primary Examiner—Fritz Fleming
(74) Attorney, Agent, or Firm—Mayer Brown & Platt

(57) ABSTRACT

A novel control circuit for magnetizing and demagnetizing an electric permanent chuck includes a single alternating current source with a selected frequency and phase. A circuit that generates electrical pulses is coupled to the alternating current source to produce pulses at a multiple of the frequency of the alternating current source. The pulse generating circuitry also sets the phase of the pulses relative to the phase of the alternating current source at a predetermined value. The pulses are then applied to the gates of one or more silicon controlled rectifiers ("SCRs") which control current flow through the electric permanent chuck. By adjusting the phase of the electrical pulses, the amount of current and average DC voltage applied to a coil of the electric permanent chuck through an SCR can be controlled.

47 Claims, 26 Drawing Sheets

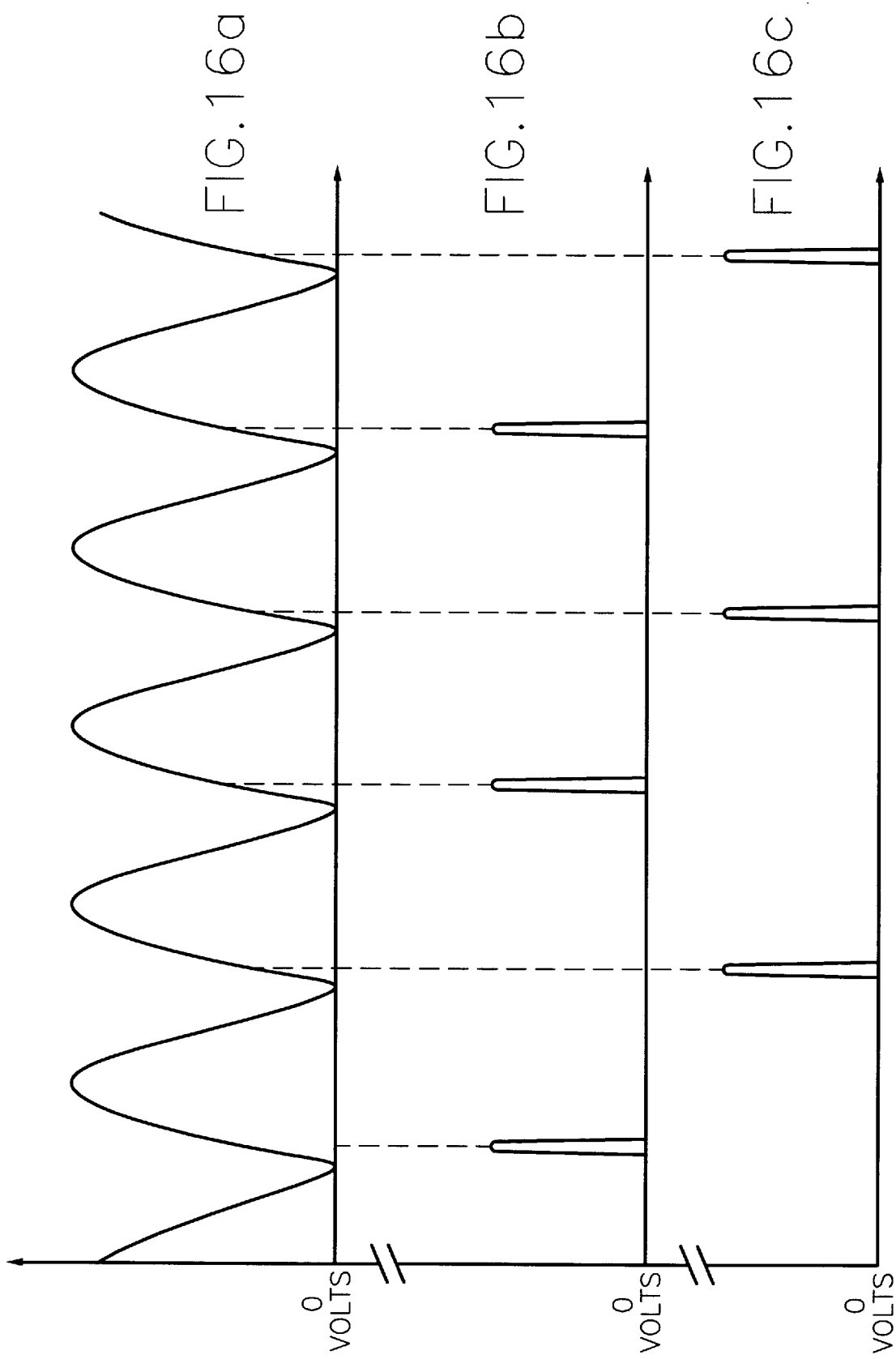

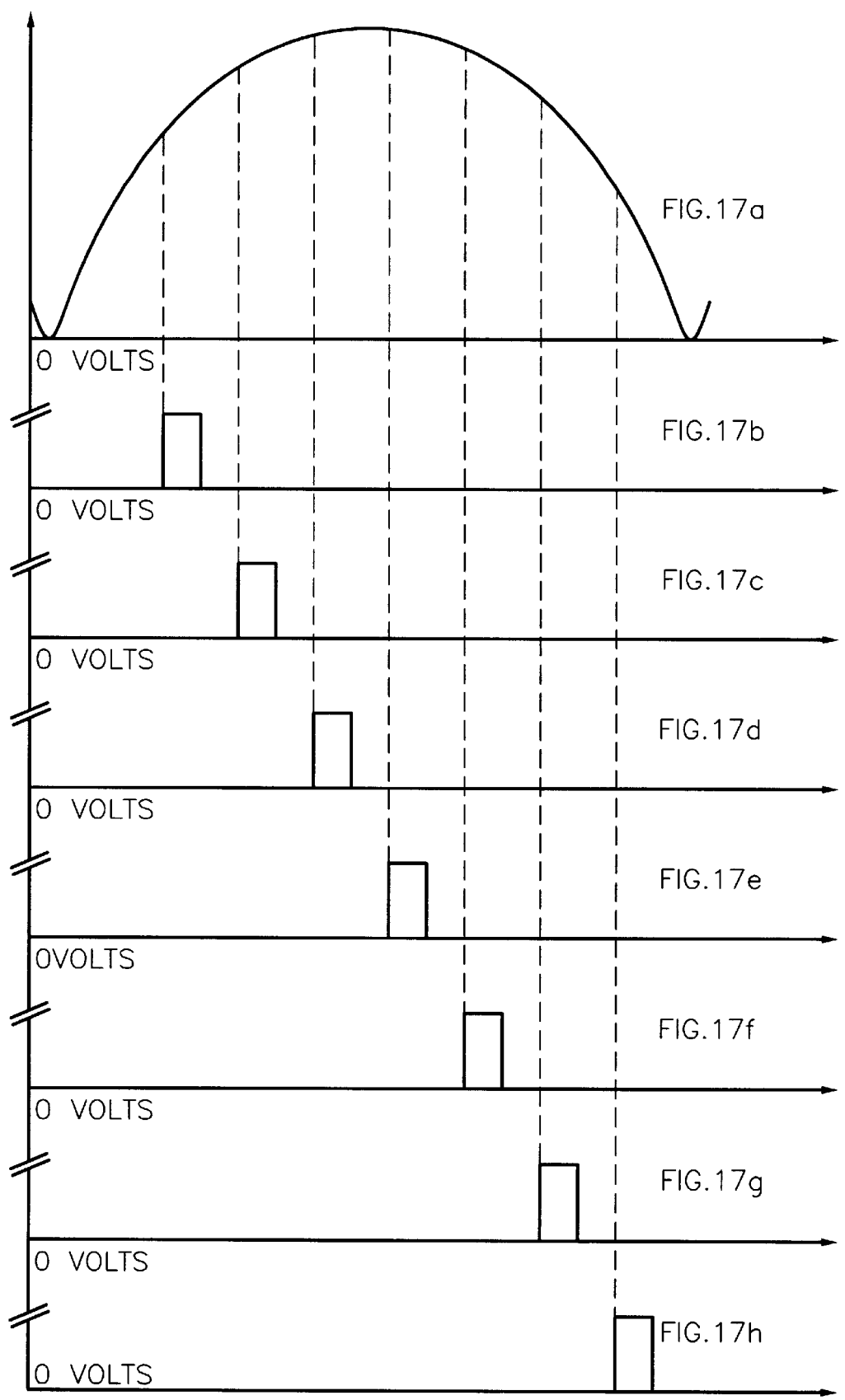

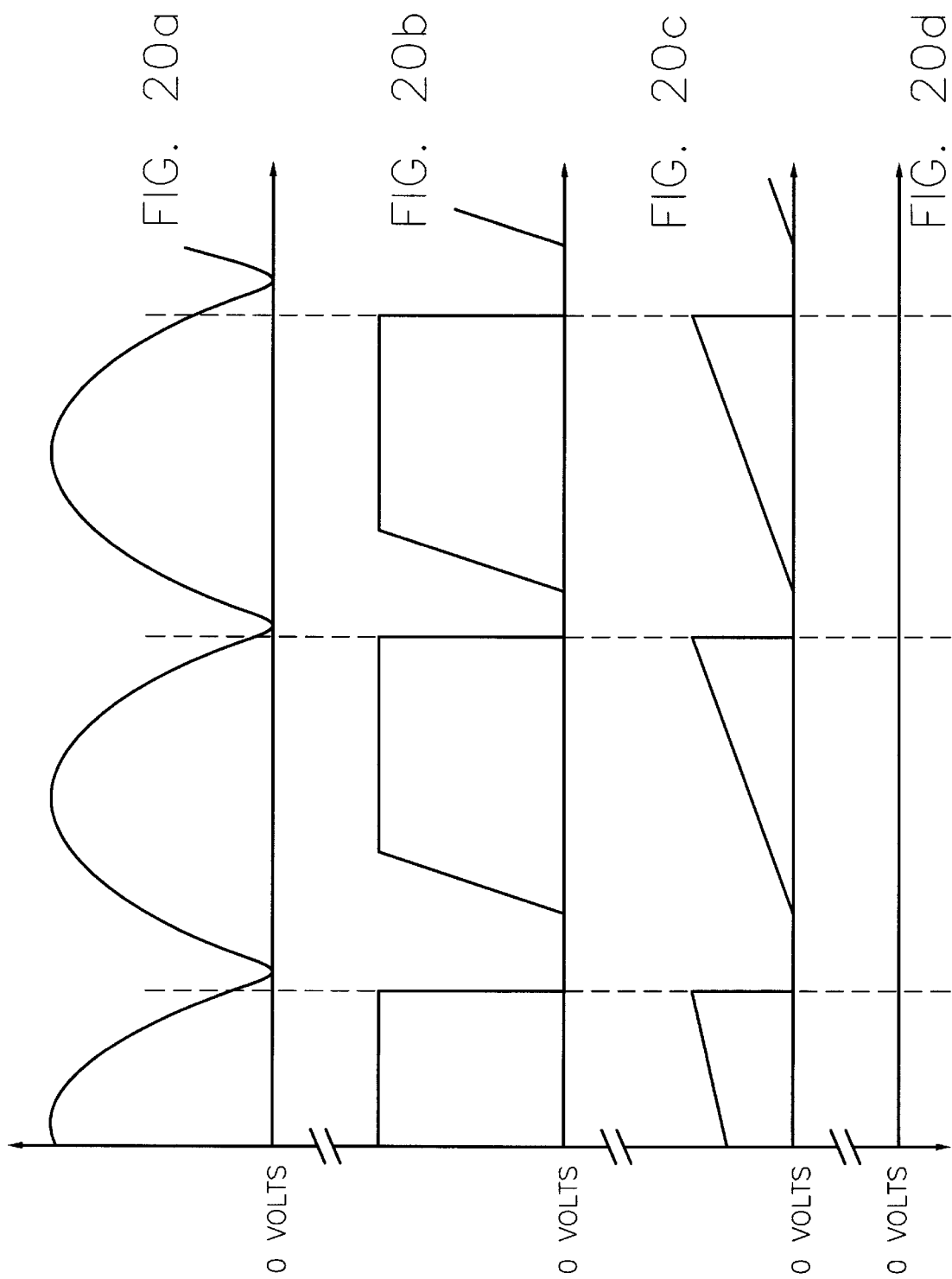

NOTE: ALL PNP'S ARE 2X.

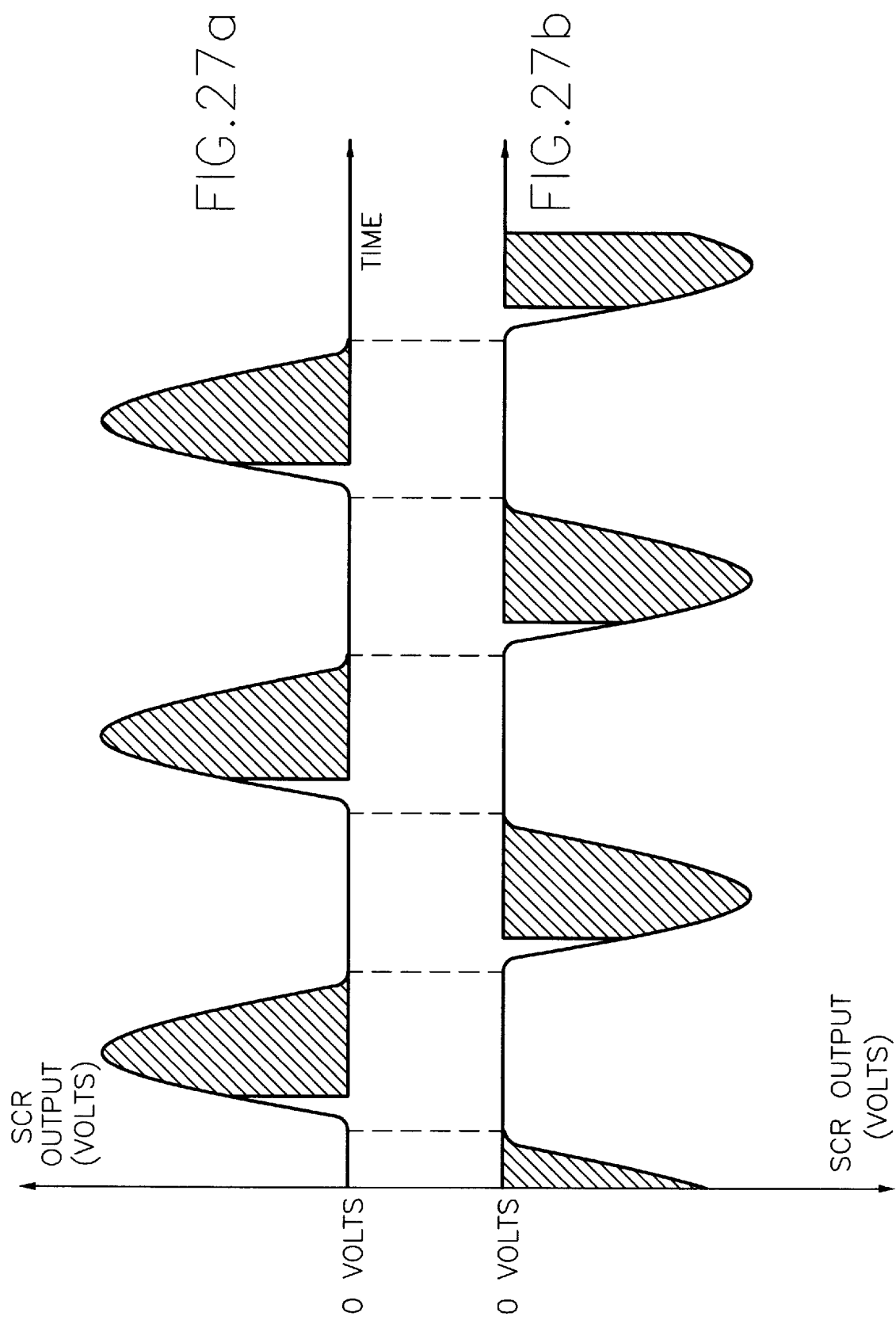

CONTROLLER FOR ELECTRIC PERMANENT CHUCK

FIELD OF THE INVENTION

The present invention relates to electric permanent chucks in general and more particularly to a method and apparatus for selectively magnetizing and demagnetizing an electric permanent chuck.

BACKGROUND OF THE INVENTION

Electromagnetic chucks are used on various machine tools such as, for example, milling machines, drill presses, lathes, and surface grinders for holding a workpiece in position while a machining operation is effected upon the workpiece. The chucks hold the workpiece by means of a magnetic field. Traditional electromagnetic chucks comprise one or a plurality of electrical coils inducing magnetic flux lines in electromagnetic cores made of a ferromagnetic material such as low carbon, high permeable steel or cast iron. The electric coils are wound in such direction and the holding surfaces of the diverse electromagnets are arranged such that areas of opposite magnetic polarities are engaged by the workpiece, with the result that the workpiece, also made of ferromagnetic material, is held on the surface of the electromagnetic cores. Operation of a traditional electromagnetic chuck requires application of a continuous direct current to maintain the magnetic flux through the coils. A typical controller for such an electromagnetic chuck can be seen in Littwin, U.S. Pat. No. 3,579,053.

One of the drawbacks of utilizing a traditional electromagnetic chuck is its tendency to retain residual magnetism, called hysteresis, after turning off the current inducing the magnetization. It has been found that to demagnetize the chuck, and the engaged workpiece, a sequence of successive reversals of current in the electrical windings of the chuck with successively decreasing current can be applied until the current (and residual magnetism) approaches zero. Because of the high inductance present in the electromagnetic chuck coils and workpiece, this process can require excessive expenditure of energy and time.

Another disadvantage of traditional electromagnetic chucks is their requirement that a continuous current be applied through the chuck to maintain the magnetic field, and, hence, the holding power of the chuck. If power to the chuck is lost for any reason, the chuck will lose some or all of its magnetism. This is particularly a danger if a workpiece is being subjected to surface grinding at the time the power is lost.

To overcome some of the drawbacks of traditional electromagnetic chucks, through experimentation with different composite magnetic materials, certain manufacturers, including Eclipse and Tecnomagnete, have developed electric permanent chucks that dispense with the need to continuously apply a direct current to maintain a magnetic flux through the coils of the chuck. Unlike traditional electromagnetic chucks, which are generally made of steel or cast iron, these permanent chucks are manufactured from various rare earth metals and are somewhat more expensive than traditional electromagnetic chucks. The nature of the materials used to manufacture the chucks allows the device to be magnetized in only one direction, i.e., the device has only one direction of polarization.

Accordingly, to energize fully an electric permanent chuck, a direct current of sufficient power need only be supplied to the chuck coils for a short time in the polarizing direction, on the order of tenths of seconds. Even if power is lost to the controller after the chuck is magnetized, the electric permanent chuck will remain magnetized and continue to hold the workpiece. To demagnetize the chuck, a demagnetization charge is applied to the chuck in a direction opposite to the direction of the original charge on the chuck. Because of the natural direction of the polarity of the chuck, the chuck can generally be demagnetized in a single step, that is, the charge can be reduced to zero by applying a current in the direction opposite to that utilized to magnetize the chuck in a single step and for a relatively short period of time. Once this is done, there is little to no residual magnetism present in the chuck. This is in contrast to traditional electromagnetic chucks that require a series of reduced, reversing charges to demagnetize fully the chuck and the workpiece.

Even though the magnetic charge of the electric permanent chuck can be reduced to zero in a single step, because the workpiece (which may be made of steel) may still hold a residual charge, it is often desirable (for instance in grinding operations where the operator may want to manually remove a workpiece for testing) to remove any residual magnetism in the workpiece. Thus, the present invention incorporates a method of demagnetizing electromagnetic chucks by applying a series of oppositely directed and successively decreasing current to the chuck coils in a novel way also to remove residual charge in the workpiece being held by the electric permanent chuck.

An example of a controller for an electric permanent chuck is shown in U.S. Pat. No. 5,267,119 to Armond et al. This controller, unlike the present invention, requires the use of three-phase AC for applying a greater voltage than the source voltage to the chuck to demagnetize the chuck. Moreover, this controller does not contain circuitry for applying a series of reverse charges to the chuck to demagnetize a workpiece. The present invention is adapted to work with a single AC voltage source, does not contain any power transformers or capacitors between the source of power and the chuck to be magnetized and demagnetized, and combines circuitry for removing residual magnetization of a workpiece. The present invention also provides a plurality of outputs for use with multiple, independently controlled chucks and with multiple coils on a single chuck, including circuitry for simultaneously applying current in opposite directions to adjacent coils of the electric permanent chuck.

SUMMARY OF THE INVENTION

The present invention addresses the above problems of controlling an electric permanent chuck by employing a single alternating current source with a selected frequency and phase. A circuit that generates electrical pulses is coupled to the alternating current source to produce pulses at a multiple of the frequency of the alternating current source. The pulse generating circuitry also sets the phase of the pulses relative to the phase of the alternating current source at a predetermined value. By adjusting the phase of the electrical pulses, the amount of current and average DC voltage applied to a coil of the electric permanent chuck through a silicon controlled rectifier ("SCR") can be controlled.

The alternating current source is connected to at least one coil of the electric permanent chuck through one or more SCRs. This rectifier has a gate that is coupled to the electric pulse generating circuit so that when the gate is energized by an electric pulse, it allows current to flow from alternating current source to at least one coil of the electric permanent chuck in a predetermined direction.

The controller also includes circuitry to regulate the transmission of the pulses to the gate of a SCR. As the electric permanent chuck will become fully magnetized after sufficient current is supplied to the coils of the chuck in the polarizing direction, and will remain magnetized thereafter (even upon removal of the current), by regulating the number of pulses transmitted to the gate of the SCR, the circuit governs the amount of time that current that is applied to the coils of the electric permanent chuck. and hence the amount of current that is applied.

In a preferred embodiment of the invention, the control circuit is connected to an AC power source and the terminals of an electric permanent chuck to be magnetized and demagnetized. In an alternative embodiment, the controller is connected to a plurality of electric permanent chucks, each chuck being operable selectively and independently from the others.

In either embodiment, there are no power transformers or capacitors between the source of AC power and the electric permanent chuck. Two sets of two SCRs each are connected to each of two respective sets of coils of an electric permanent chuck, each set of coils being polarized in opposite directions, with oppositely polarizing coils being adjacent to one another. Each set of two SCRs is configured to allow current to flow in opposite directions and is connected to a set of the coils that are polarizing in the same direction. A circuit selectively switches application of the electrical pulses to the gate of one or the other of the SCRs of each set of two SCRs to allow current to flow in either the magnetizing or demagnetizing direction through the set of coils to which the set of SCRs are attached. The control circuitry also allows transmission of the electrical pulses to the gate of a SCR for a predetermined period of time of approximately 0.27 seconds. Allowing current to flow for this time period is sufficient to magnetize or demagnetize fully the electric permanent chuck.

The controller also contains a current sensing transformer to detect the flow of current from the alternating current source to the electric permanent chuck coils and a charge indicating circuit to signal when sufficient and/or insufficient current has flowed to the electric permanent chuck to magnetize the chuck. Similarly, the transformer is used in the demagnetizing phase in conjunction with a release indicating circuit to signal when sufficient and/or insufficient current has flowed to the electric permanent chuck to achieve full demagnetization.

Finally, the preferred controller contains circuitry to adjust the relative phase between the alternating current source and the electrical pulses applied to the gates of one or more SCRS. In a second alternative embodiment, to achieve demagnetization of the electric permanent chuck and to remove any residual magnetic charge in the associated workpiece, a series steps of successively decreasing reversing currents are applied to the electric permanent chuck coils via the SCRs. With each step of current, the phase of the electrical pulses is increased relative to the phase of the alternating current source, causing the SCRs to be triggered later during a half-wave of the alternating current transmitted by the alternating current. By delaying triggering, less average current is transmitted through the SCRs to the electric permanent chuck coils. Also with each step, the electrical pulses are alternatingly directed by a switching circuit to one or the other of the two SCRs of each set of SCRs. This switching directs current in opposite directions through the electric permanent chuck coils with each step. In this way, the residual charge of the workpiece is quickly and efficiently reduced to levels allowing the operator to remove manually the workpiece from the chuck. This feature is particularly useful in grinding applications as detailed below.

BRIEF DESCRIPTION OF THE DRAWINGS

FIGS. 16a–c are timing diagrams showing a full-wave rectified A/C signal (FIG. 16a), and the relative phase of pulses generated by the pulse generating circuit (FIGS. 16b, 16c).

FIGS. 17a–h are timing diagrams showing a half wave of a full-wave rectified A/C signal (FIG. 17a), and the relative phase of a pulse generated by the pulse generating circuit (FIGS. 17b–h).

FIGS. 20a–d are timing diagrams of a full-wave rectified A/C signal (FIG. 20a), and the voltage on a capacitor in the pulse generating circuit (FIGS. 20b–d).

FIGS. 27a–b are timing diagrams depicting the output of SCRs in the power circuit during operation of the electric permanent chuck controller.

DETAILED DESCRIPTION

Figure 1:
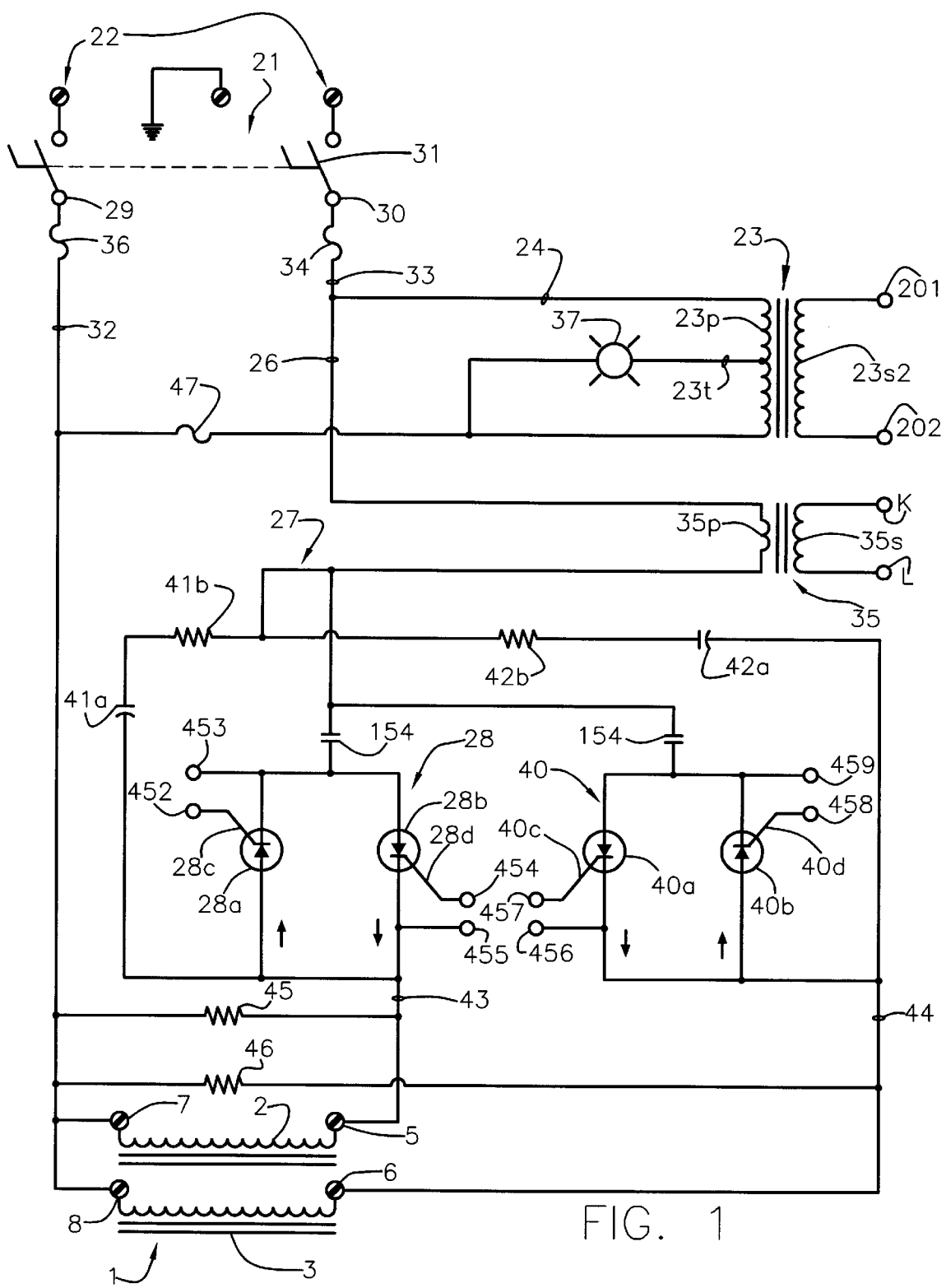
FIG. 1 is a circuit diagram of a power circuit described herein for controlling an electric permanent chuck.

FIG. 1 shows a power circuit for magnetizing and demagnetizing an electric permanent chuck 1. This circuit can be used to operate an electric permanent chuck, such as the type manufactured by Eclipse, model number TEMP1. The chuck 1 is constructed with adjacent but oppositely polarizing coils 2 and 3 such that causing current to flow through each adjacent coil in the opposite direction creates a series of oppositely polarized magnetic fields to engage a workpiece (not shown). The chuck 1 can be used for various machining applications such as grinding and milling as described more fully in U.S. Pat. No. 5,267,119 to Armond et al.

Various phases are involved in controlling the chuck, which are referred to herein as modes. Magnetizing the chuck for holding the workpiece is identified as the CHARGE mode. After the working operation (grinding) is performed on the workpiece, a discharging step is performed, to demagnetize the chuck and workpiece, which releases the workpiece, and this is identified as the RELEASE mode. Additionally, at times, less than a full charge is imposed on the chuck for holding, and this is referred to as the VARIABLE mode.

Figure 2:
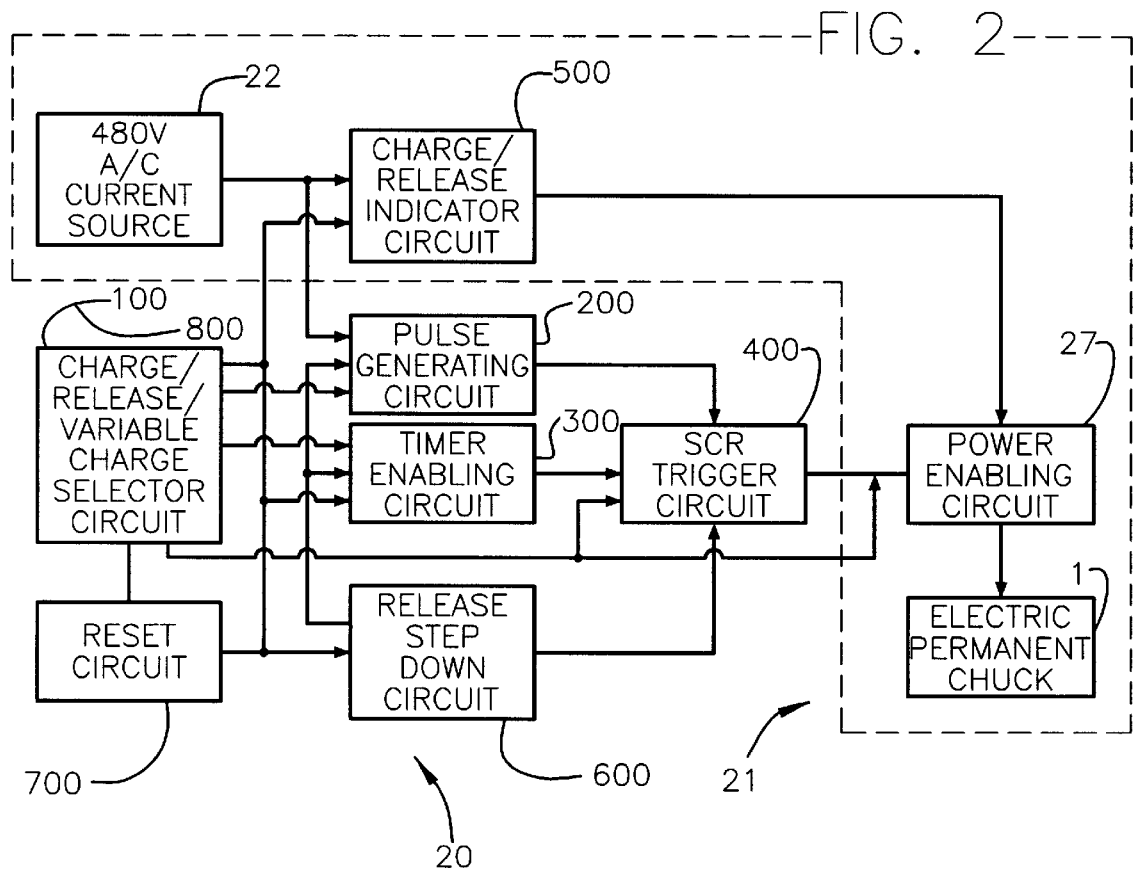
FIG. 2 is a block diagram of an electric permanent chuck controller.

FIG. 2 outlines a block diagram of the controller, which is divided into a control circuit 20 and a power circuit 21. The control circuit is comprised of a CHARGE/RELEASE selector circuit 100, including circuitry for operating the chuck in the VARIABLE CHARGE mode, a pulse generating circuit 200, a timing circuit 300, and SCR trigger circuit 400 for triggering SCR modules 28 and 40 in the power transmission circuit 27. The control circuit also includes a CHARGE/RELEASE indicating circuit 500 to signal the operator when the chuck has been fully charged and fully released and a reset circuit 700 to enable the control circuitry for operation upon power up. As described in detail below, an alternative embodiment of the control circuit may also include a stepdown release circuit 600 for applying a series of successively decreasing and oppositely directed currents to the coils of the chuck to effectuate full demagnetization of a workpiece. In a second alternative embodiment, the CHARGE/RELEASE selector circuit 800 is designed to operate separately multiple chucks using the same control circuitry.

FIG. 1 depicts the circuitry comprising the preferred power circuit. To this circuit is attached, via terminals 29 and 30, an AC power source 22 through disconnect switch 31. The preferred controller utilizes a 480 VAC power source, although any other source of alternating current with sufficient power to magnetize and demagnetize the electric permanent chuck can be utilized. The power circuit consists of two conductors 32, 33 leading from the terminals 29 and 30 respectively. Terminal 30 is connected through fuse 34 in parallel to the primary winding 23p of a control transformer 23 via line 24 and routed through a current sensing transformer 35 via line 26. The other terminal 29 is connected through fuse 36 via a common line 32 to terminals 7 and 8 of both sets of coils 2,3 within the electric permanent chuck. As will be understood, the two sets of oppositely polarizing coils 2 and 3 of multiple chucks 1a, 1b, 1c can also be connected in parallel using the circuit depicted in FIG. 3. In this alternative embodiment, contactors 154 are removed from the power circuit 27, contactors 154a, 154b, and 154c substituted therefore. Although shown therein with three chucks with respective polarizing coils wired in parallel, more or less chucks can be so configured limited only by the current capacity of power source 22. The preferred embodiment can handle up to 4 chucks at one time.

Turning back to the initial embodiment shown in FIG. 1, the common line 32 is configured so that the two sets of coils 2 and 3 are polarized in opposite directions of current flow as shown by polarizing arrows. Thus, for example, current flowing from terminal 5 to terminal 7 of coil 2 would magnetize that coil, while current flowing from terminal 8 to terminal 6 of coil 3 would magnetize that coil.

The control transformer 23 connected to the alternating current source 22 via line 24 steps down the voltage from the AC power source to supply power to the control circuitry 20. In the preferred embodiment, the transformer reduces the voltage from 480 volts AC to 15 volts AC. The transformer also contains a tap 23t to which an indicator light 37 is connected to reflect the presence of current through the transformer and allows the operator to know that power is being supplied to the control circuitry.

Line 26 passes through current sensing transformer 35 and is connected through contactors 154 to the two SCR modules 28 and 40. Filter circuits 41 and 42, each consisting of a power capacitor 41a, 42a and resistor 41b, 42b in series, are connected in parallel to contactors 154. The filter circuits serve to suppress any voltage spikes that appear across the terminals of the SCR modules 28 and 40. In the preferred embodiment, each SCR module consists of two SCRs 28a and 28b, and 40a and 40b. The SCR pair within each module is arranged to allow current to flow through the two SCRs in opposite directions as indicated by the arrows. Each SCR has a gate 28c, 28d, 40c, and 40d that is coupled to the control circuitry via pulse transformers 401, 402, 403, and 404 shown in FIG. 7. Each module is then respectively connected via lines 43 and 44 to a set of oppositely polarizing coils 2 and 3 in the electric permanent chuck 1. Resistors 45 and 46 are connected to lines 43 and 44 in parallel with the electric permanent chuck coils 2 and 3.

Figure 12:
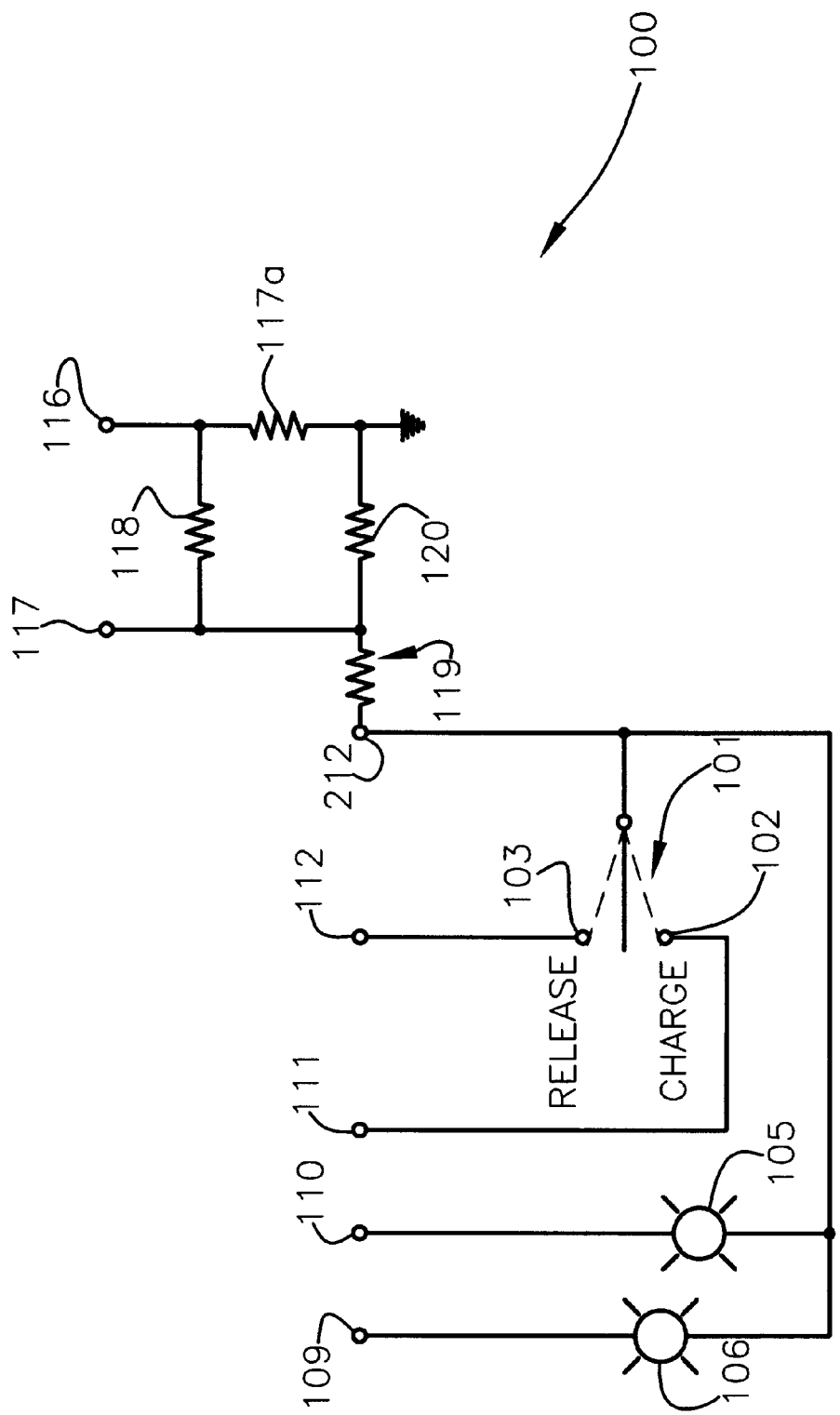
FIG. 12 is a circuit diagram of a portion of the CHARGE/RELEASE/VARIABLE CHARGE selector circuit of the electric permanent chuck controller described herein.
Figure 13:
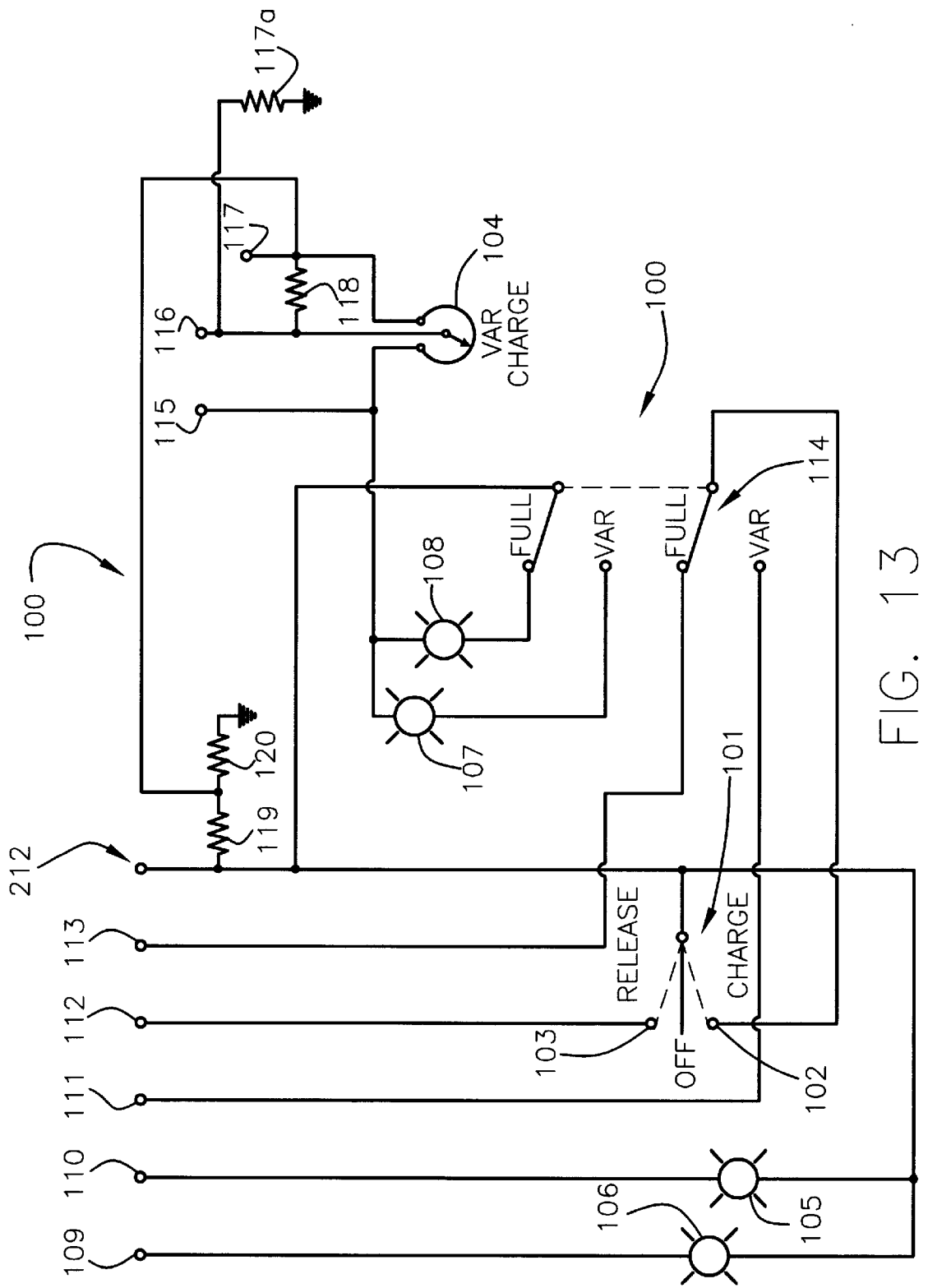
FIG. 13 is a circuit diagram of an alternative to the CHARGE/RELEASE/VARIABLE CHARGE selector circuit depicted in FIG. 12 that can be used to operate the electric permanent chuck controller in the VARIABLE CHARGE mode.

FIG. 12 depicts a CHARGE/RELEASE switch circuit 100 utilized in the CHARGE/RELEASE selector circuit. FIG. 13 is identical to the circuit in FIG. 12 but also includes the VARIABLE CHARGE feature. In the latter embodiment, the CHARGE/RELEASE switch circuit 100 consists of a CHARGE/RELEASE switch 101. The CHARGE terminal 102 of the switch is connected in series with a double pole/double throw FULL/VARIABLE CHARGE switch 114. Switch 114 is connected to potentiometer 104 to adjust the amount of current supplied to the chuck during the VARIABLE CHARGE mode.

As shown in FIG. 2, the CHARGE/RELEASE circuit 100 is connected to each of the power enabling circuit 27, the pulse generating circuit 200, the timer enabling circuitry 300, and the charge/release indicating circuitry 500. Initiation of the CHARGE, VARIABLE CHARGE, or RELEASE mode enables the power enabling circuit 27 by closing the normally open contacts of contactor 154. Initiation of one of the modes also initiates the timer enabling circuit 300 to control application of the electrical pulses generated by the pulse generating circuit 200 to the gates of the SCRs 28a, 28b, 40a, 40b via the SCR trigger circuit 400. Depending on the mode chosen by the operator via the CHARGE/RELEASE selector circuitry 100, the charge (magnetizing) SCRs 28b, 40b or release (demagnetizing) SCRs 28a, 40a will be triggered by the electrical pulses generated by the pulse generating circuit 200. The VARIABLE CHARGE mode adjusts the phase of the electrical pulses generated by the pulse generating circuit 200 relative to the phase of the current supplied by the AC power source 22.

The control transformer 23 is connected to the pulse generating circuit 200 and steps down the AC current voltage from, for example, 480 volts to around 15 volts to be used by the control circuit. In the preferred embodiment, the pulse generating circuit generates two sets of electrical pulses at the same frequency as the frequency of the alternating current source 22 but 180° out of phase with respect to each other as shown in FIG. 16. In the VARIABLE CHARGE mode, the phase of the pulses relative to the alternating current source can be adjusted via potentiometer 104. As depicted in FIGS. 17a–h, as the resistance of the potentiometer 104 is increased, the pulses appear successively later in time with respect to the phase of a half wave of the alternating current applied to the SCRs. Accordingly, the SCRs will be triggered by the electrical pulses, and current will be allowed to flow through the electric permanent chuck, successively later in time and for a shorter interval, applying a less-than-full-charge to the chuck.

The SCR enabling circuitry 400 applies electrical pulses generated by the pulse generating circuit 200 via pulse transformers 401, 402, 403 and 404 to the gates of the SCRs 28a, 28b, 40a, and 40b selected by the CHARGE/RELEASE selector circuit 100 for a period of time controlled by the timer enabling circuitry 300.

The control circuitry also contains a CHARGE/RELEASE indicating circuit 500 that is activated upon selection of the CHARGE or RELEASE mode via the CHARGE/RELEASE switch 101. This circuit is coupled to the power circuit 21 via current sensing transformer 35. In the preferred embodiment, when sufficient current has flowed through current sensing transformer to magnetize the chuck, the CHARGE/RELEASE indicating circuit 500 turns on a charge light 105 and provides a signal for outboard equipment indicating that the chuck has been charged.

If, upon initiation of the CHARGE mode, insufficient current is transmitted to the chuck to obtain full magnetization, the CHARGE/RELEASE indicting circuit 500 causes the charge light 105 to flash on and off and provides a signal to outboard equipment indicating that the electric permanent chuck did not receive sufficient charge to hold the workpiece.

The circuitry is particularly adapted to work in machining applications such as grinding and milling. In grinding applications, often the workpiece is handled manually. Accordingly, it is necessary to remove residual charge from the workpiece upon demagnetization of the chuck to allow the operator to manipulate the workpiece manually. This is accomplished in the instant embodiment by the release step down circuit 600. Once the RELEASE mode has been selected, the control circuit applies a reversing current to the electric permanent chuck coils of equal magnitude and opposite in direction to the current used to charge the chuck. The release step down circuit then advances the phase of the electrical pulses by a given amount, and applies a current in the CHARGE direction through the chuck coils. Because the phase of the pulses has been advanced, this current is less than that applied in the initial release cycle. The circuit then advances the phase of the electrical pulses again, and applies a current in the RELEASE direction through the chuck coils. In the preferred embodiment, this process is repeated a total of seven times, which has been found to be sufficient to demagnetize most manually manipulable work pieces that harbor residual magnetism from the electric permanent chuck.

Figure 3:
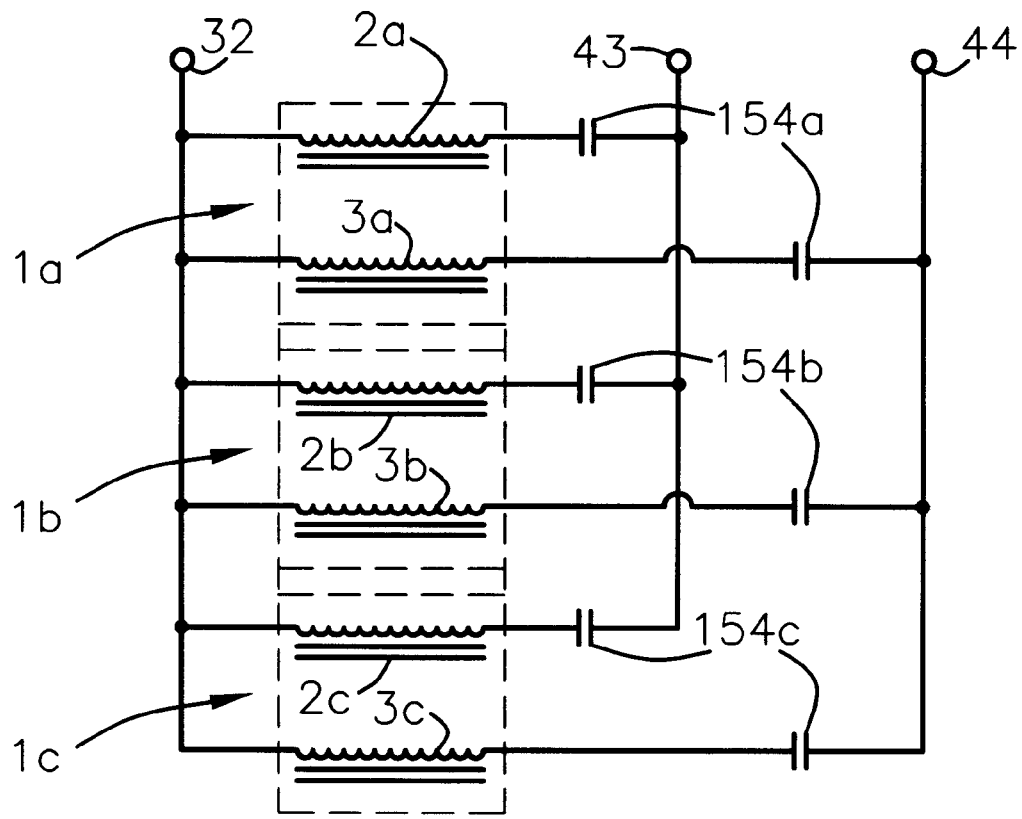
FIG. 3 is a circuit diagram depicting an alternative power circuit to the referenced portion of the circuit of FIG. 1 for operating multiple electric permanent chucks with a single electric permanent chuck controller.
Figure 15:
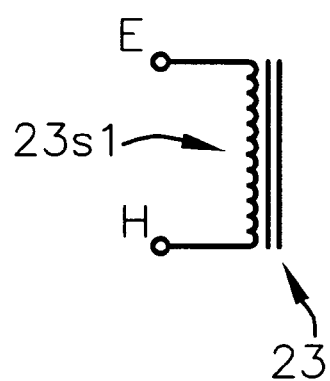
FIG. 15 is a circuit diagram of an alternative circuit to FIG. 11 to be utilized for controlling multiple electric permanent chucks with the same electric permanent chuck controller as is utilized in the control circuit for multi-chuck operation described herein.
Figure 14:
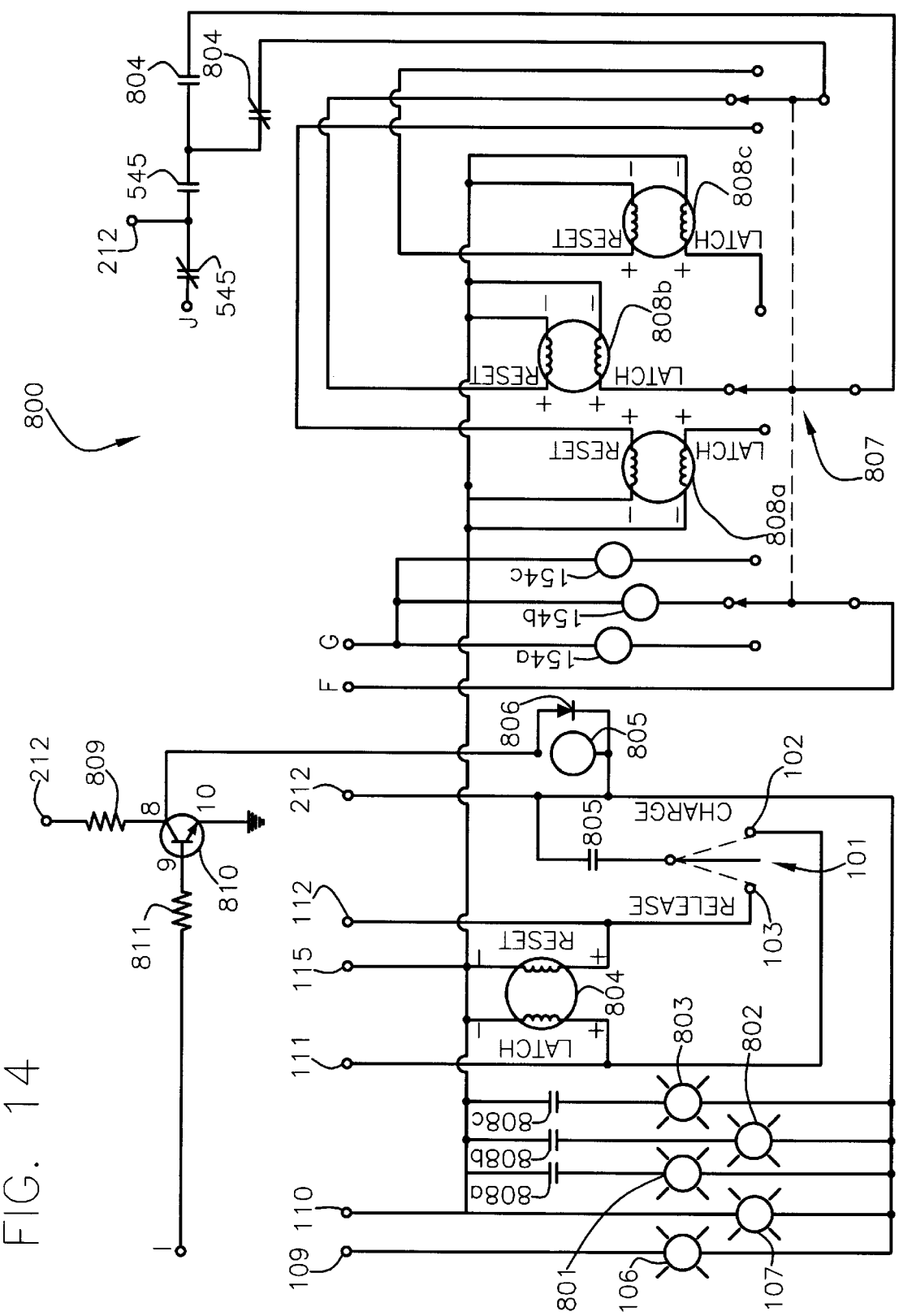
FIG. 14 is a circuit diagram of an alternative CHARGE/RELEASE/VARIABLE CHARGE selector circuit to FIG. 12 and FIG. 13 for operating multiple electric permanent chucks with the same electric permanent chuck controller as is utilized in the control circuit for multi-chuck operation.

In milling operations, because of size limitations on each individual chuck, often several chucks are used to secure much larger workpieces, which are then manipulated by heavy machinery. Thus, it is becomes necessary to control multiple chucks. The present controller also contains circuitry as shown in FIGS. 3, 14, and 15 to connect up to four chucks in parallel and to control independently each chuck. Those drawings depict a control circuit for selecting one of three different chucks using the same controller. Using switch 807, the operator can select the desired chuck to control, either 1a, 1b or 1c. Once selection is made, operation of the chuck is identical to that for the individual chuck. Although not shown, the individual controller depicted in FIG. 1 can be connected to up to four chucks as well, operating each of the chucks simultaneously.

The following is a detailed discussion of the operation, including the modes mentioned, of the control circuitry 20.

Operation

Control Circuit for Single Step Release

Figure 5:
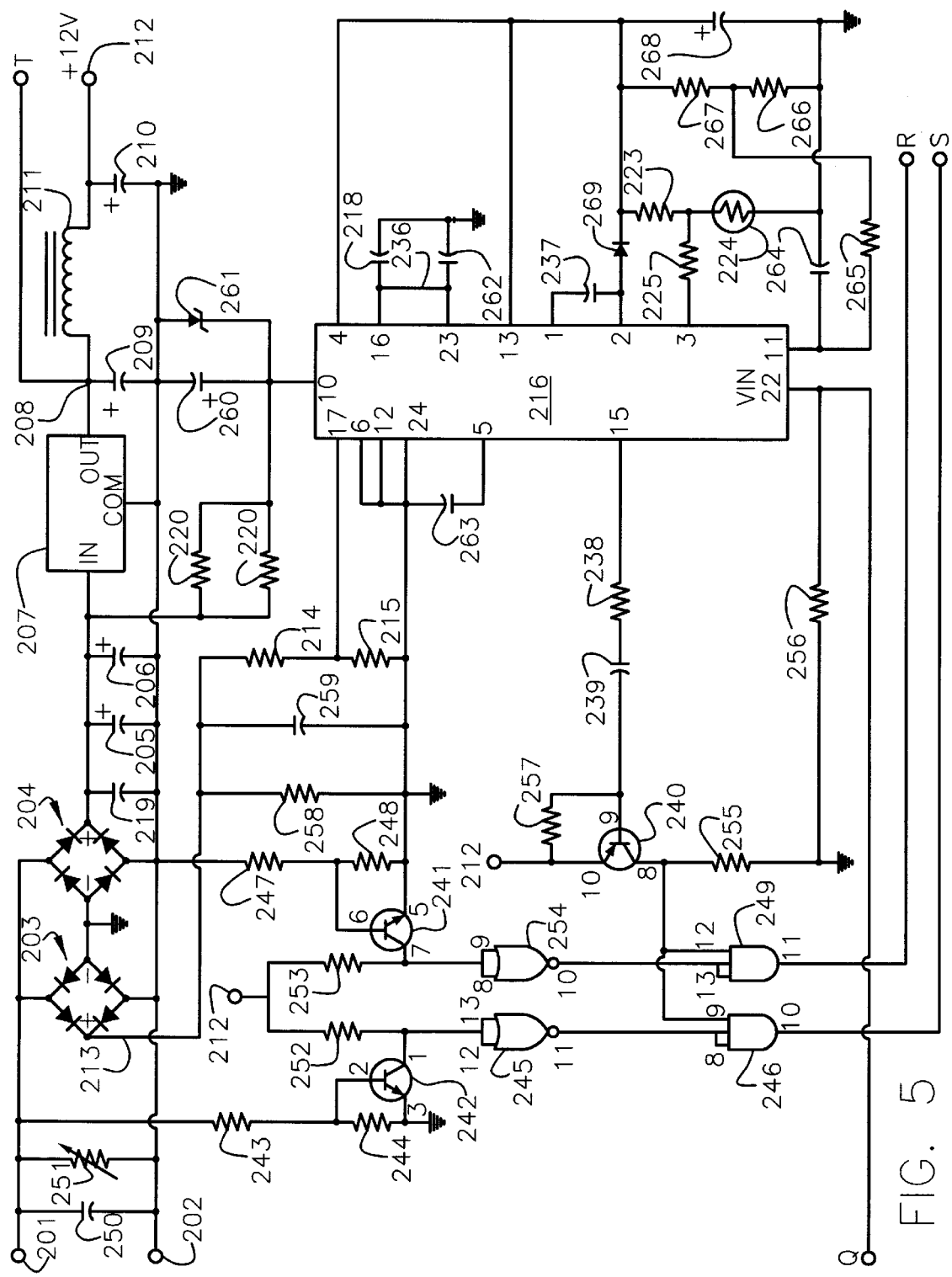
FIG. 5 is a circuit diagram of the pulse generating circuit of the electric permanent chuck controller described herein.

As shown in FIG. 5, the pulse generating circuitry consists of the secondary of control transformer 23 which is connected to terminals 201 and 202 and then to the AC input of full-wave bridge rectifiers 203 and 204, supplying approximately 15 volts AC to the control circuit. The output of bridge rectifier 204 is pulsating full-wave DC signal, which is "smoothed" by capacitors 205 and 206. This DC signal is then applied to the input of a standard voltage regulator 207. In the preferred embodiment, a standard 7812 voltage regulator is used. The output 208 of the voltage regulator 207 is 12 volts DC and is further filtered by capacitors 209 and 210 and inductor 211. The 12 volts DC output 212 from the voltage regulator 207 supplies all the power needed by the control circuitry.

Figure 18:
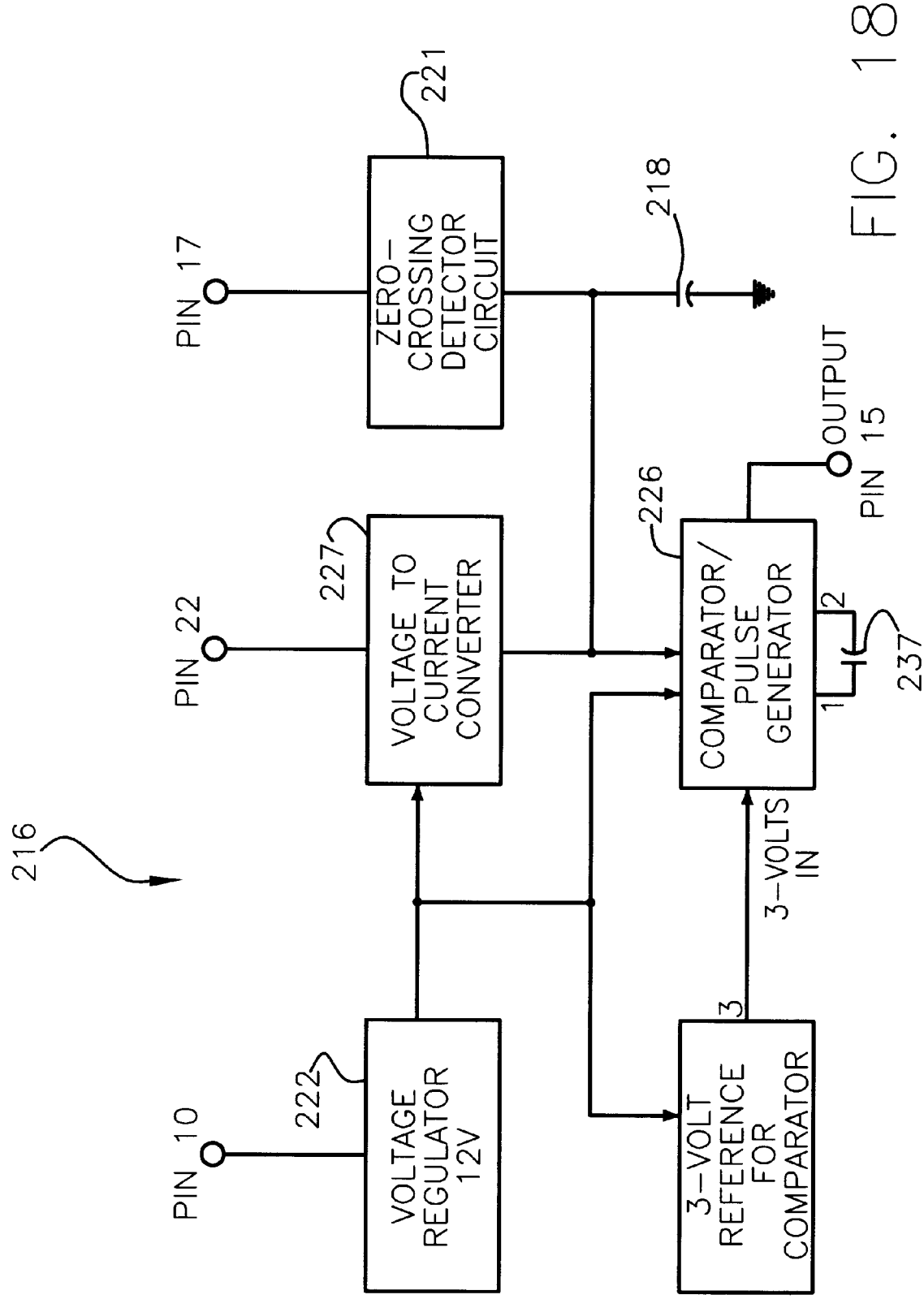
FIG. 18 is a block diagram of an integrated circuit in the pulse generating circuit.

The positive output lead 213 of bridge rectifier 203 goes into the voltage divider 214 and 215, then to pin 17 of integrated circuit ("IC") 216. IC 216 is a 24 pin integrated circuit for generating a series of electrical pulses. A block diagram of the internals of this device as used in the present invention is depicted in FIG. 18.

Figure 19:
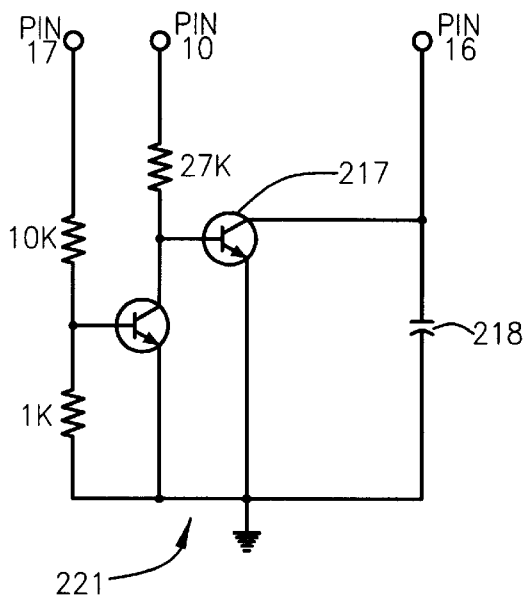
FIG. 19 is a circuit diagram of a zero-crossing detector utilized in the pulse generating circuit.

Pin 17 is internally connected to a standard zero-crossing detector circuit 221, such as that depicted in FIG. 19.

Zero-crossing is referred to as the period or phase of an AC line sine wave where is passes the zero point before it goes into another half cycle. In a 60 Hz power line there are 60 cycles or complete sine waves a second. In any given cycle, there are 2 zero crossings. Therefore, 120 zero crossings occur in one second. The time interval between each zero crossing is 8.3 milliseconds (0.0083 seconds). FIG. 20*a* shows the wave form of the DC output of bridge rectifier 203. The zero points on this waveform correspond to the zero crossings of the AC line power.

As depicted in FIG. 19, at each zero crossing at pin 17 of IC 216, an internal transistor 217 turns on pulling down the output of pin 16 to ground, discharging the capacitor 218.

The DC output of bridge rectifier 204 is filtered by capacitors 219, 205, and 206 and, through resistor 220, is applied to pin 10 of IC 216. An internal voltage regulator 222 maintains 12 volts DC at output pin 13. This voltage powers the internal circuitry of IC 216. By means of a voltage divider circuit 223 and the 50 k thermistor 224, then through resistor 225, 3 volts is applied to pin 3 of IC 216. The internal comparator circuit 226 will use this 3-volt reference voltage to trigger its circuitry.

Figure 21:
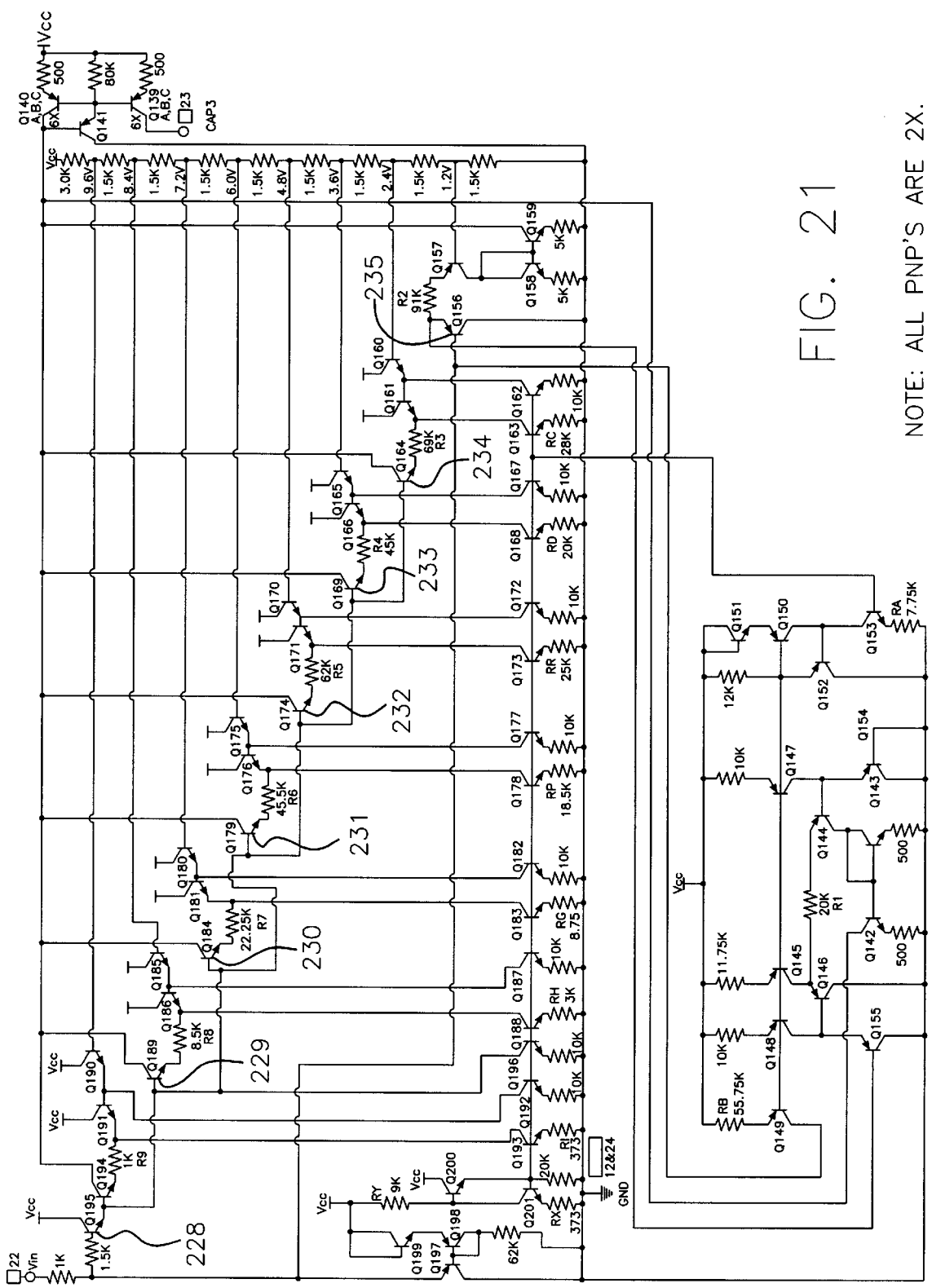
FIG. 21 is a circuit diagram of a voltage-to-current converter utilized in the pulse generating circuit.

Pin 22 of IC 216 is externally connected to a variable voltage source including potentiometer 104 that varies between 0 and 12 volts DC. This voltage is applied internally to a linear voltage to current converter 227. This module consists of a series of transistors as depicted in FIG. 21. Each transistor connects a resistor (also internal) to a voltage divider network. When the voltage at pin 22 of IC 216 is increased from zero to 12 volts, the transistors 228 through 235 are turned on in succession. As the voltage gets to about 12 volts DC, all of the transistors are activated. The output of the internal voltage divider is connected to pin 23. As the internal transistors are turned on, capacitor 218 with charge up. The more transistors that are enabled, the faster capacitor 218 will charge.

FIGS. 20*b*, 20*c,* and 20*d* illustrate the charging rate on capacitor 218 as a function of the control voltage applied to pin 22. FIG. 20*b* shows the waveform for capacitor 218 when voltage at pin 22 is 12 volts DC, which charges capacitor 218 at its fastest rate. FIG. 20*c* shows the waveform for capacitor 218 when voltage at pin 22 is about 6 volts DC. FIG. 20*d* shows the waveform for capacitor 218 when voltage at pin 22 is zero.

Figure 24:
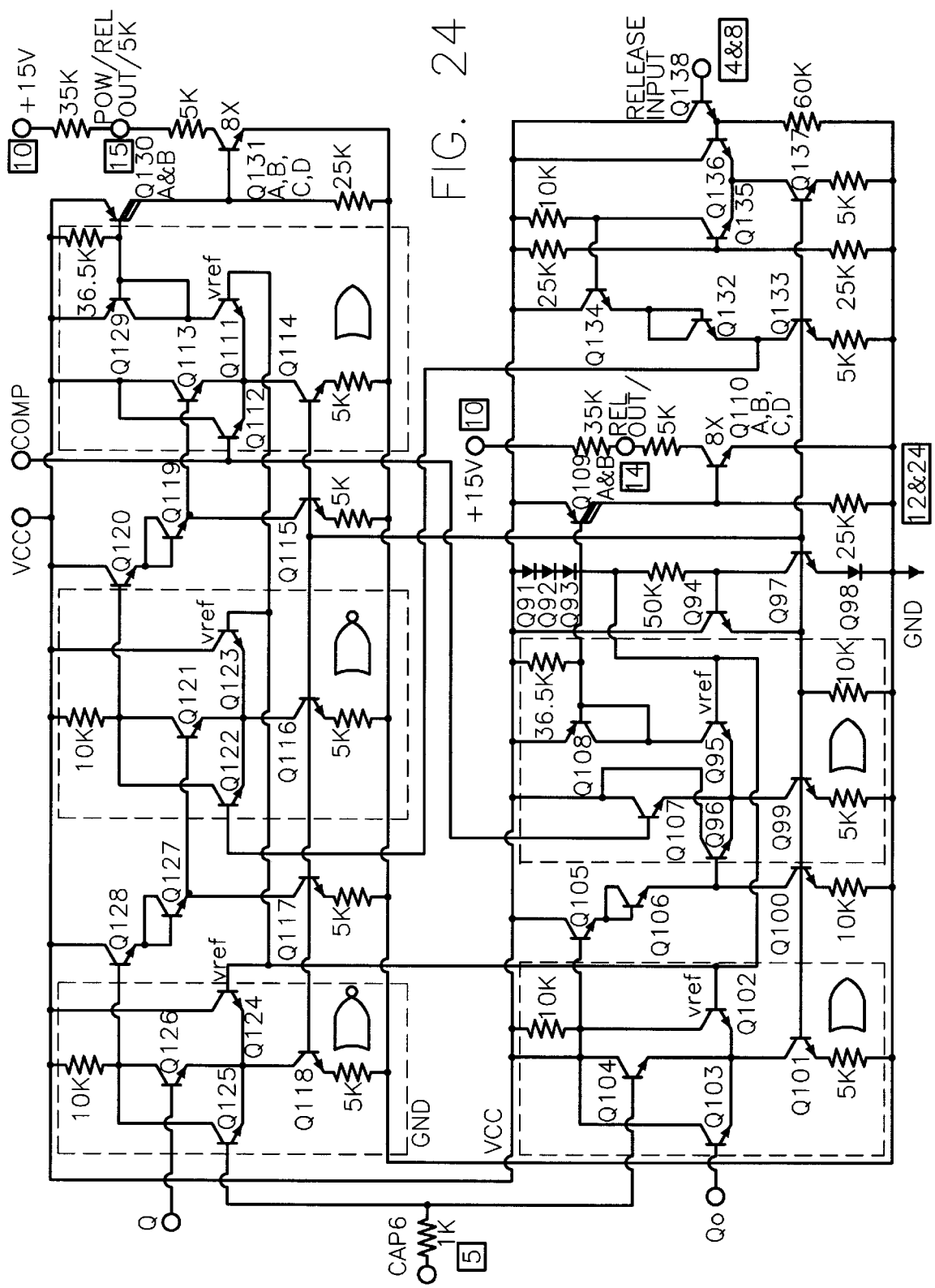
FIGS. 24 and 25 are circuit diagrams of a comparator/pulse generator utilized in the pulse generating circuit.
Figure 25:
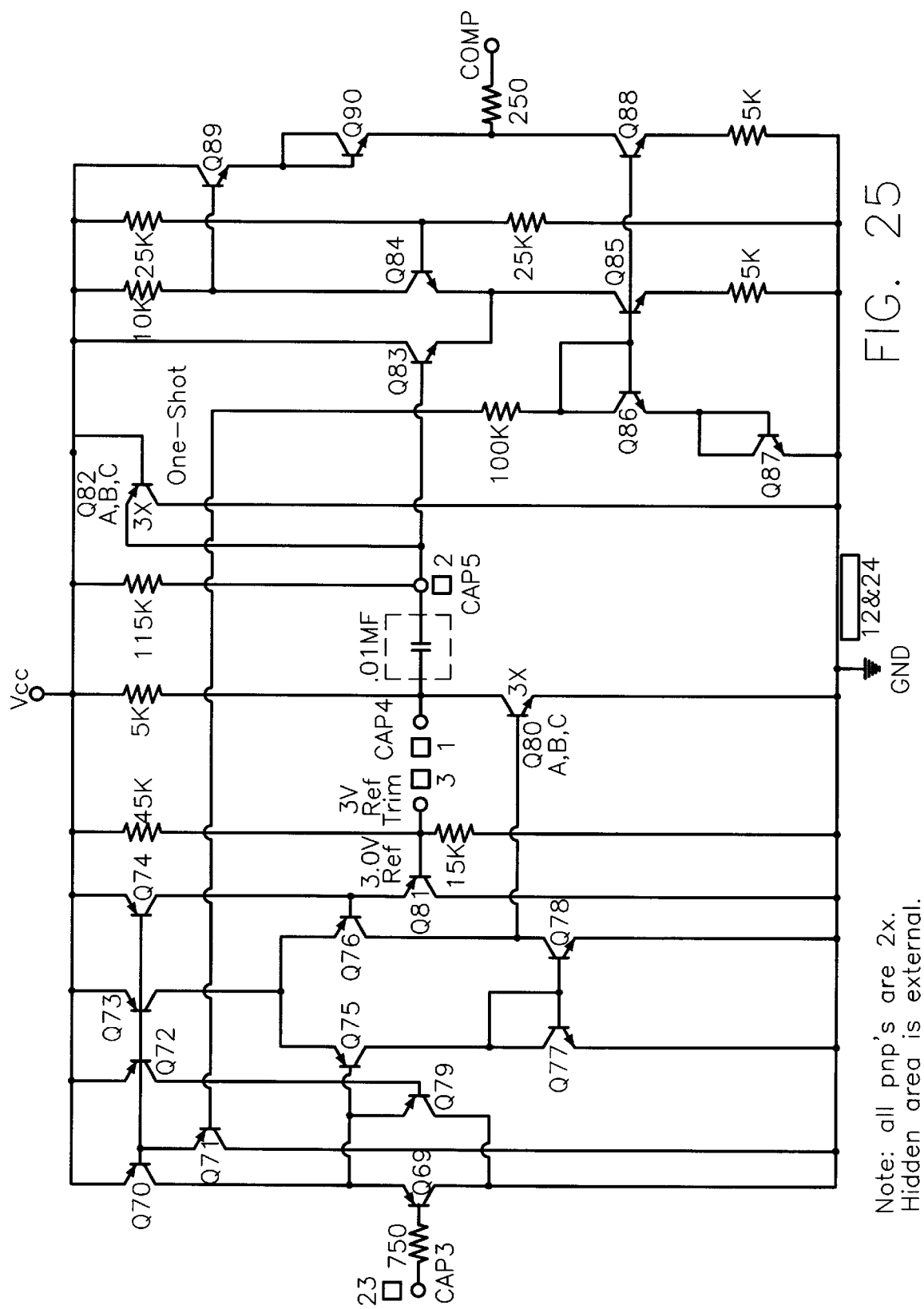

The voltage across capacitor 218 comes from pin 23 of IC 216. The 3-volt reference at pin 3 of IC 216, is the set point where the internal comparator is triggered. Whenever a zero crossing on the AC line occurs, pins 16 and 23 of IC 216 will be pulled to ground by the zero-crossing detector circuit. Pins 16 and 23 are wired together externally by line 236. Capacitor 218, which is connected to pins 16 and 23 will discharge quickly. After the zero crossing point, pins 16 and 23 are removed from ground. Capacitor 218 will then start charging again via the voltage to current converter 227. As soon as the voltage across capacitor 218 reaches the 3-volt reference set point, the internal comparator produces a pulse at pin 1. An example of a comparator circuit is shown at FIGS. 24 and 25. An external capacitor 237 is connected between pins 1 and 2. This capacitor is used to produce a sharp pulse which will then be used as the source of the trigger for the SCRs. Pin 15 of IC 216 is the output for these trigger pulses.

FIGS. 22*a–c* illustrate the timing relationships between the zero-crossings, capacitor 218 voltage, and pulses at output of pin 15. FIG. 22*a* shows the output of bridge rectifier 203. FIG. 22*b* shows the voltage on capacitor 218.

Figure 22:
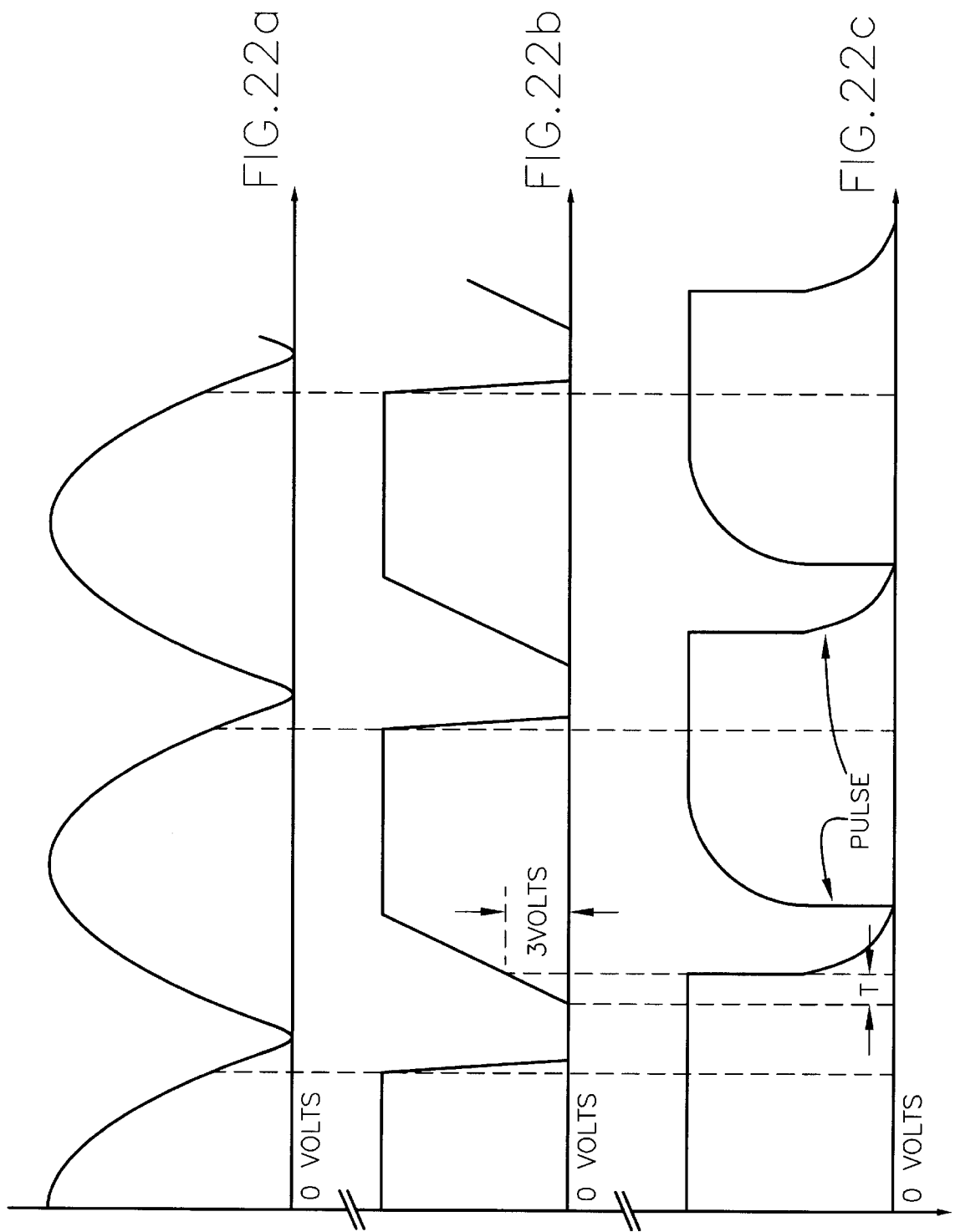
FIGS. 22a–c are timing diagrams of a full-wave rectified A/C signal (FIG. 22a), the voltage of a capacitor in the pulse generating circuit (FIG. 22b), and an output in the pulse generating circuit (FIG. 22c).
Figure 23:
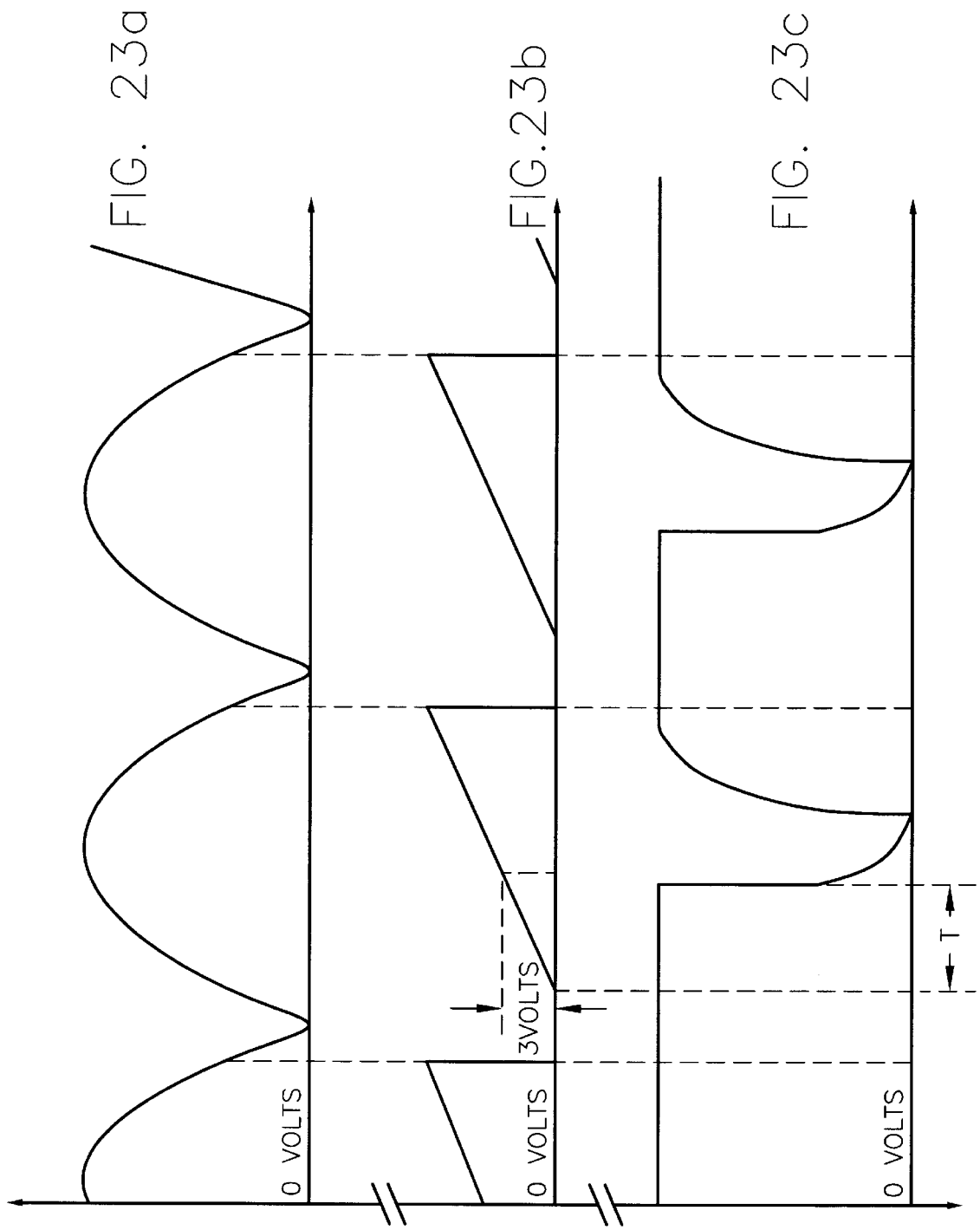
FIGS. 23a–c are timing diagrams similar to FIGS. 22a–c except that a different bias voltage has been applied to the pulse generating circuit.

FIG. 22*c* shows the output of pin 15 of IC 216. Notice that the pulse is triggered only when the capacitor 218 charges from zero to three volts, delaying the appearance of the pulse by time T after capacitor 218 begins to charge. The waveforms in FIG. 22 are shown when 12 volt DC is applied to pin 22. If less voltage is applied, capacitor 218 will charge more slowly and time T will be greater, delaying the trigger pulse within a half-wave of the AC line current as shown in FIGS. 23*a–c*. From pin 15, the trigger pulse goes through resistor 238 and capacitor 239 which further transforms it into a sharp pulse. The pulse is then inverted by PNP transistor 240. In the preferred embodiment, the PNP transistors are all Motorola Quad Bipolar PNP Transistors, model number MPQ2906, although other suitable devices performing the same function can be substituted. The final trigger pulse is obtained at the collector pin 8 of 240.

NPN transistor 242 is turned on whenever the 15 volt AC line voltage at terminal 201 applied to the gate of transistor 242 through voltage divider 243 and 244 is at its positive half-cycle. All NPN transistors in the preferred embodiment are Motorola Quad NPN Transistors, model number MPQ222A, although other suitable devices performing the same function can be substituted. Pin 11 of NOR gate 245 is logic HIGH whenever 242 is on. All NOR gates in the preferred embodiment are Motorola Quad 2-Input "Nor" Gates, model number MC14001BCP. The HIGH on pin 11 of NOR gate 245 enables AND gate 246 and allows the trigger pulses to appear at its output. The AND gates utilized in the preferred embodiment are Motorola Quad 2-Input "And" Gates, model number MC14081BCP.

The other line of the 15 volt AC line at terminal 202 applied to the gate of transistor 241 through voltage divider 247 and 248 turns on transistor 241 whenever it is on its positive half cycle. AND gate 249 is enabled whenever transistor 241 is on. The outputs of AND gates 246 and 249 are each applied through terminals R and S to a respective input of 405 and 406 shown in FIG. 7. FIGS. 16*b* and 16*c* show these waveforms. The pulses alternate between the outputs of gates 246 and 249, appearing on every other half wave at each output.

These pulses are used to trigger the series of SCRs 28*a*, 28*b*, 40*a*, 40*b* used as phase control rectifiers. Phase control is the process of rapid on/off switching of a device which connects an AC supply to a load for a controlled fraction of a half-cycle. Similar to a diode, the SCR allows current to flow in one direction only. An SCR can be triggered into conduction by a momentary application of a control current to the SCR's gate such as a pulse as short as a fraction of a second. Once the SCR is triggered on, it will remain on until the current flow through it falls below the minimum holding rating of the SCR.

Figure 4:
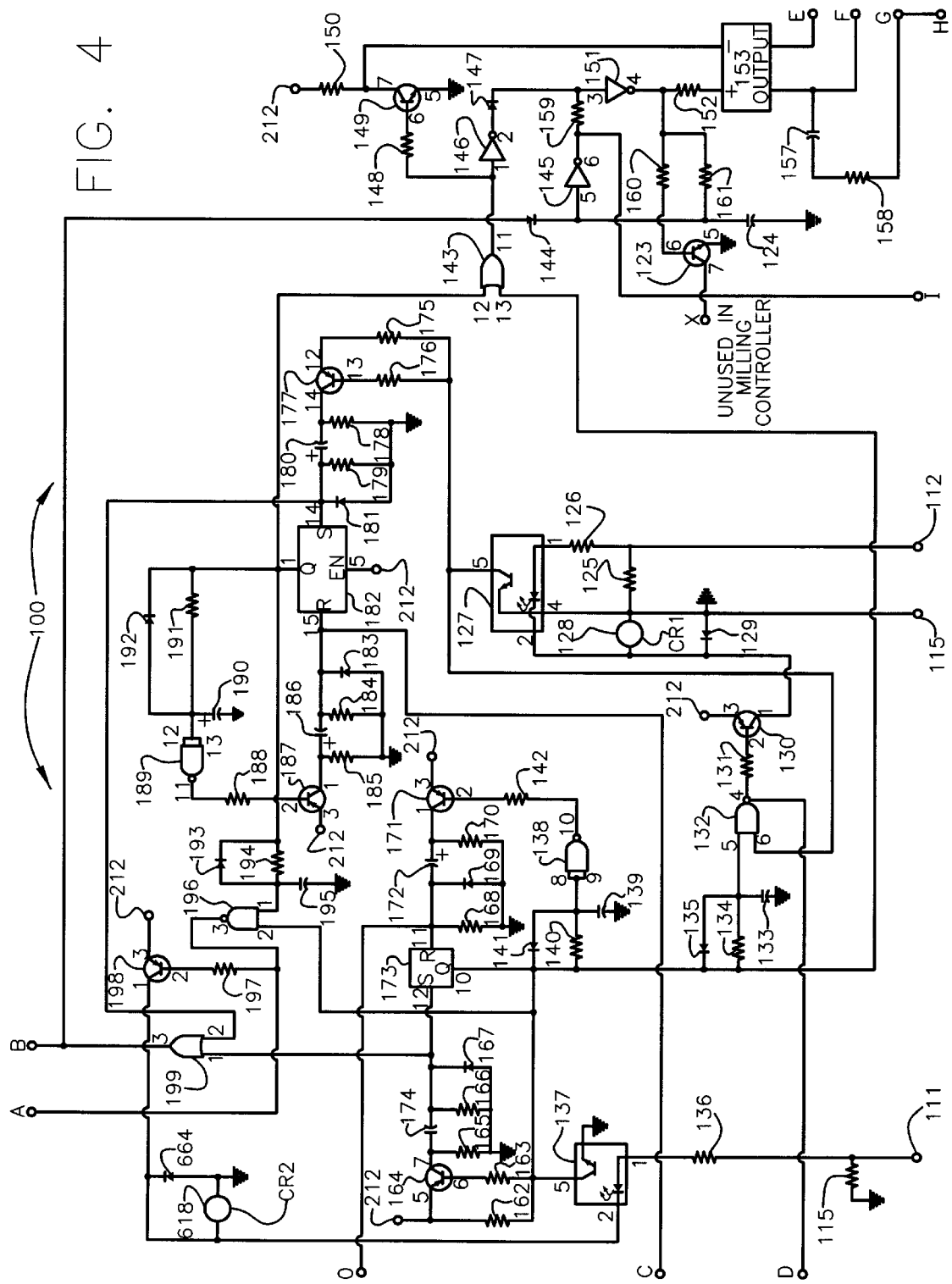
FIG. 4 is a circuit diagram of a portion of the CHARGE/RELEASE/VARIABLE CHARGE selector circuit of the electric permanent chuck controller described herein.
Figure 11:
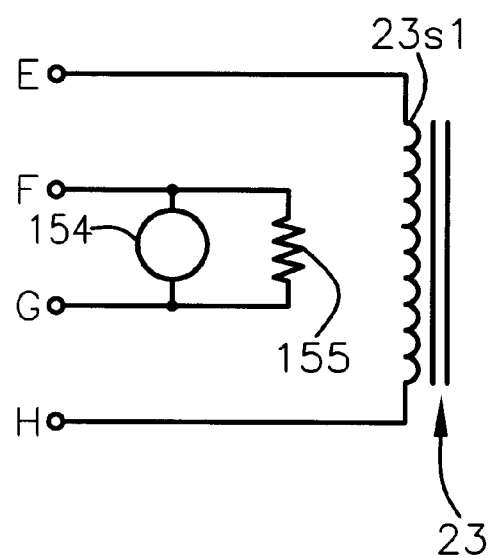
FIG. 11 is a circuit diagram of a portion of the CHARGE/RELEASE/VARIABLE CHARGE selector circuit of the electric permanent chuck controller described herein.

To charge the electric permanent chuck, first the charge/release switch 101 shown in FIG. 12 is turned to the charge position. This causes a HIGH to appear on terminal 111 and causes opto-coupler transistor 137 (FIG. 4) to turn on, making its pin 5 turn LOW. Transistor 164 then turns on, putting a logic HIGH on pin 12 of S/R gate 173 and pin 1 of OR gate 199. The OR gates utilized in the preferred embodiment are all Motorola Quad 2-Input "Or" Gates, model number MC14071BCP. The S/R gates are all R/S Flip-Flops, model number 4043BCP. Pin 3 of OR gate 199 goes logic HIGH, and through diode 144 latches gates 145 and 151. Solid state relay 153 turns on and contactor 154 (shown in FIG. 11) energizes.

The HIGH on pin 10 of S/R gate 173 also triggers relay 128. Through its normally open contracts, pin 3 of NAND gate 306 (shown in FIG. 6) becomes logic LOW momentarily. This activates timer 301. In the preferred embodiment, this timer is either an RCA Timer NE555P or Motorola MC1455P1, although any other suitable timing circuit will suffice. The NAND gates are all Motorola Quad 2-Input "Nand" Gates, model number MCI4011BCP.

The output at pin 3 of timer 301 becomes logic HIGH while 301 is timing. Through the normally open contacts of relay 128, S/R gate 313 is also set, placing a logic HIGH on its pin 2 and enabling AND gate 302 and placing a HIGH on terminal U. Terminal U is connected to AND gates 405 and 406 as shown on FIG. 7, and they both become enabled. The trigger pulses now appear on pin 3 of AND gate 405 and pin 4 of AND gate 406.

Figure 9:
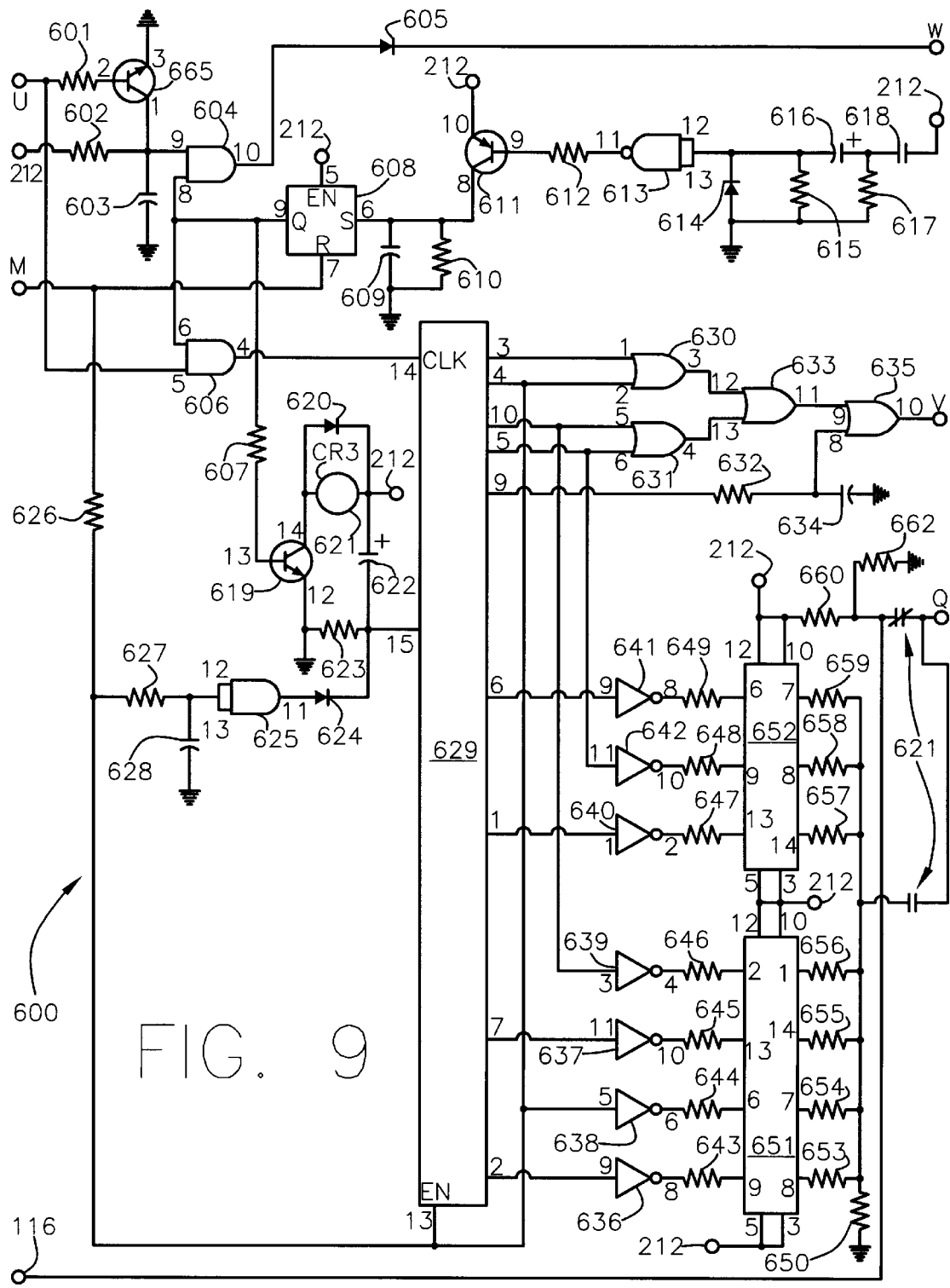
FIG. 9 is a circuit diagram of the RELEASE/step-down circuit of the electric permanent chuck controller described herein.
Figure 10:
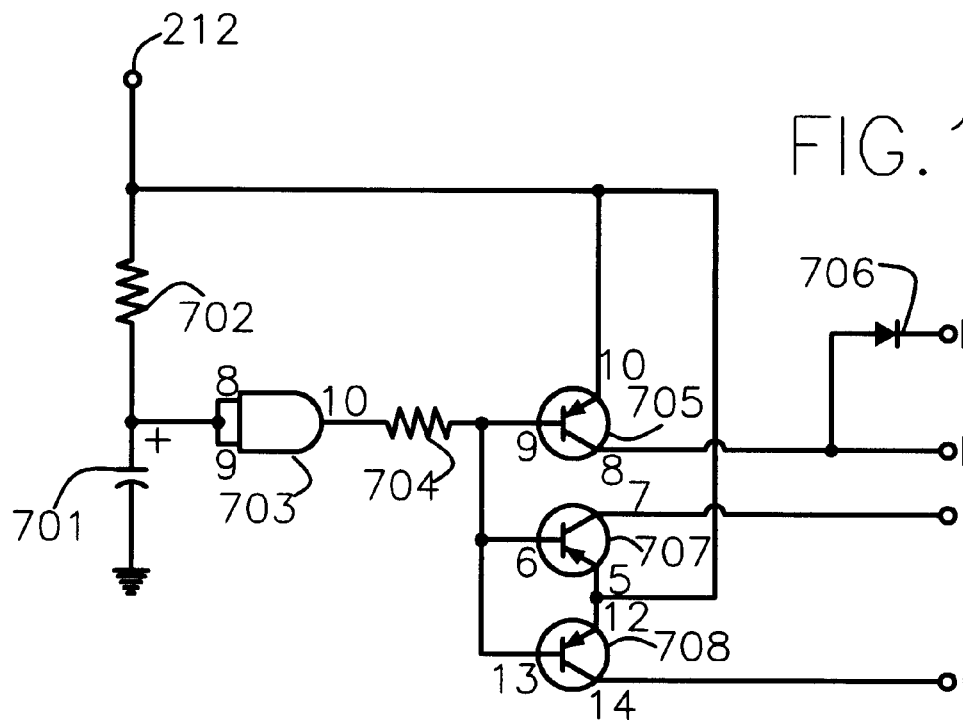
FIG. 10 is a circuit diagram of a reset circuit of the electric permanent chuck controller described herein.
Figures 26A, 26B, 26C:
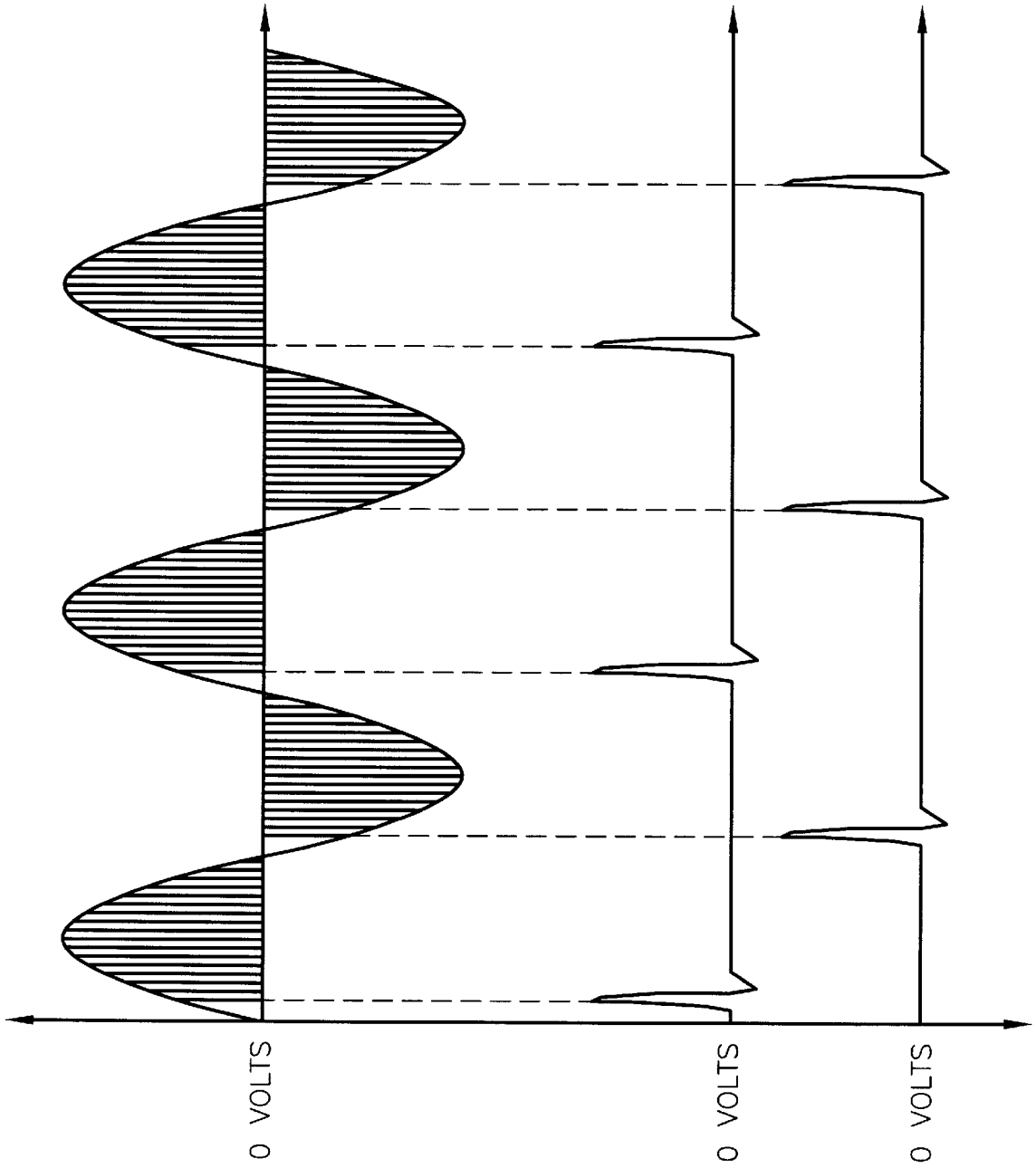
FIGS. 26a–c are timing diagrams of a full-wave rectified A/C signal (FIG. 26a), and pulses applied to the gates of SCRs in the power circuit (FIGS. 26b–c).

Upon power-up of the controller, decade counter divider 629 as shown in FIG. 9 is in its reset mode. Thus, its pin 3 is logic HIGH. In the preferred embodiment this chip is a Motorola Decade Counter Divider model number MC14017BCP. Pin 3 of OR gate 630, pin 11 of OR gate 633 and pin 10 of OR gate 635 are also HIGH. Through terminal V, AND gates 408 and 407 (shown in FIG. 7) are enabled, while gates 409 and 410 are disabled. The trigger pulses thus appear at the outputs of AND gates 408 and 407. Pulse transformers 401 and 402 are energized at each trigger pulse, each one triggering during alternating half waves. FIGS. 26b and 26c show the wave forms of at the secondaries 401s, 402s of pulse transformers 401 and 402.

These trigger pulses appear at the gates of SCRs 28a and 40a. FIG. 26 is a timing diagram that illustrates the triggering of the SCRs in response to the trigger pulses. The shaded portions of the AC line current depicted in FIG. 26a signifies when the SCRs are enabled and transmit current to the electric permanent chuck. Once a trigger pulse is applied to the gate of the SCR, the SCR will remain on for the remainder of that half cycle. It will shut off only when current through it is very small such as when it approaches a zero crossing point. FIGS. 27a and 27b simulate the output of SCRs 40a and 28a, respectively. During the CHARGE mode, coil 2 will receive a negative halfwave rectified DC voltage, while a positive half-wave DC voltage will be applied to coil 3.

Once triggered, timer 301 (shown on FIG. 6) times out after 0.27 seconds, and its pin 3 becomes logic LOW. Pin 3 of AND gate 302 also becomes logic LOW as does terminal U. This disables AND gates 405 and 406 shown on FIG. 7, shutting off the pulses to their outputs and the pulse transformers. All SCRs are turned off and no DC current is transmitted to the electric permanent chuck.

Figure 8:
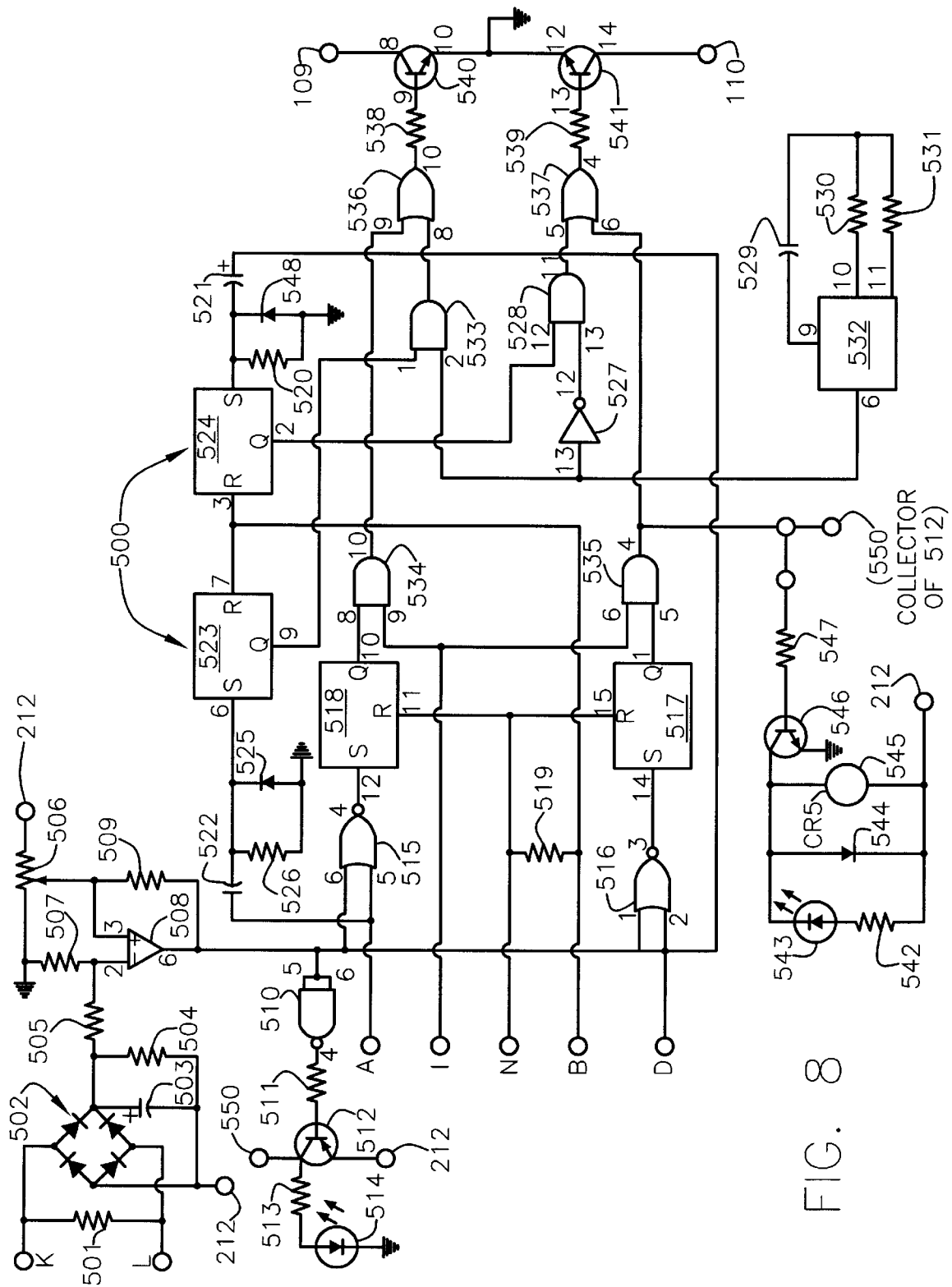
FIG. 8 is a circuit diagram of the CHARGE/RELEASE indicator circuit of the electric permanent chuck controller described herein.

The current sensing transformer 35 shown on FIG. 1 consists of a donut shaped transformer. One line 26 of the AC power source 21 goes through the loop of this current transformer. The secondary winding 35s of the transformer is wound inside the transformer. When there is current flow through the AC line such as when power is being applied to the magnetic chuck, this current also passes through the loop 35s of the current sensing transformer, and induces a voltage across terminals K and L. As shown in FIG. 8, the voltage induced in the secondary by current flow in line 26 is rectified by bridge rectifier 502 and applied to pin 2 of voltage comparator 508. In the preferred embodiment, the comparator is a Motorola OP Amp model number MC1741CP1, although any compatible comparator circuit can be used. When the voltage applied at pin 2 of the comparator 508 through voltage divider 505 and 507 equals or exceeds the preset voltage at pin 3 applied through potentiometer 506, the output of comparator 508 at pin 6 becomes logic LOW. This output is applied to pin 1 of NOR gate 516. Since during the CHARGE mode the output of NAND gate 132 (shown on FIG. 4) and, hence, terminal D are LOW. A logic LOW is applied to pin 2 of NOR gate 516. The output of NOR gate 516 thus becomes logic HIGH. The output at pin 1 of S/R gate 517 goes logic HIGH, which is applied to one input of AND gate 535. Pin 4 of AND gate 535 becomes logic HIGH which activates transistor 546, energizing relay 545. Output of OR gate 537 becomes HIGH and turns on transistor 541 collector pin 14 pulling terminal 110 LOW. This turns on CHARGE lamp 105 (shown in FIG. 12) to indicate that the electric permanent chuck has been properly charged.

If there is insufficient current to trigger the comparator 508, pin 6 of OR gate 537 will remain LOW. The output pin 6 of ripple counter divider 532 toggles between HIGH and LOW. In the preferred embodiment, this device is a Motorola Ripple Counter Divider model number MC14060BCP. The output of IC 532 is applied through inverter 527 to AND gate 528, causing transistor 541 and CHARGE lamp 105 to toggle on and off. Thus, when there is insufficient charge relay 545 will remain de-energized and the green CHARGE lamp 105 will be blinking. In the preferred embodiment, the inverters are all Motorola Trigger Inverters, model number MC14106BCP, although any comparable device will not significantly impede performance.

To activate the RELEASE mode, the charge/release switch is turned to the release position as shown in FIG. 12. This causes terminal 112 to go HIGH and opto-coupler transistor 127 (FIG. 4) to turn on. Its pin 5 becomes logic LOW. Transistor 177 (collector pin 14) turns on. This puts a logic HIGH to pin 14 of S/R gate 182, causing pin 1 of that gate to become logic HIGH. Pin 11 of 143 then becomes logic HIGH, transistor 149 (collector pin 7) turns on and Solid State Relay 153 turns on, energizing contactor 154 (shown in FIG. 11), and connecting the SCR modules 28 and 40 to the alternating current source 22 through line 26. Output of NAND gate 196 becomes low and transistor 198 (collector pin 1) turns on, energizing relay 618. As shown in FIG. 9, the normally open contacts of 618 put a logic HIGH to pins 12 and 13 of NAND gate 613, making pin 11 logic LOW. Transistor 611 (collector pin 8) turns on, putting a logic HIGH to pin 6 of S/R gate 608. The output of gate 608 becomes HIGH, as well as the outputs of AND gates 606 and 604.

The output of AND gate 604, through diode 605, puts a logic HIGH to pins 1 and 2 of NAND gate 306 (shown in FIG. 6), making its output logic LOW and triggering timer 301. Its pin 3 becomes logic HIGH as does terminal U. AND gates 405 and 406 (FIG. 7) become enabled and the trigger pulses appear at their outputs. Pin 4 of AND gate 606 (as shown in FIG. 9) also becomes HIGH sending a logic HIGH to pin 14 of Decade Counter Divider 629. Pin 2 of Decade Counter Divider 629 becomes logic HIGH, and the rest of the outputs of the IC (1, 3, 4, 5, 6, 7, 9) turn LOW. Pin 10 of OR gate 635 becomes logic LOW putting a LOW on terminal V. This causes pin 12 of inverter 411 shown in FIG. 7 to go logic HIGH. This enables AND gates 409 and 410, and disables AND gates 407 and 408. The trigger pulses now appear at the outputs of gates 409 and 410, energizing pulse transformers 403 and 404. The secondaries of these transformer are induced and reflect the same trigger pulses at the gates of SCRs 28b and 40b. Because SCRs 28b and 40b are configured in an opposite direction to SCRs 28a and 40a, the current through each set of coils 2 and 3 is applied in a direction opposite to that used during the CHARGE mode. The previous charge on the permanent magnets inside the magnetic chuck is now reduced to a negligible amount so that the pieces held by the electric permanent chuck are completely released.

Turning back to FIG. 9, when pin 2 of Decade Counter Divider 629 becomes logic HIGH, pin 8 of inverter 636 becomes LOW, making the output at pin 8 of transistor bank 651 HIGH. When S/R gate 608 became SET as indicated above, it energized relay 621, causing its normally open contacts to close. Through the voltage divider consisting of resistors 653 and 650 about 11 volts DC is applied to terminal Q through the normally open contacts (now closed) of relay 621. This puts about 11 volts on pin 22 of IC 216 as shown in FIG. 5.

Figure 6:
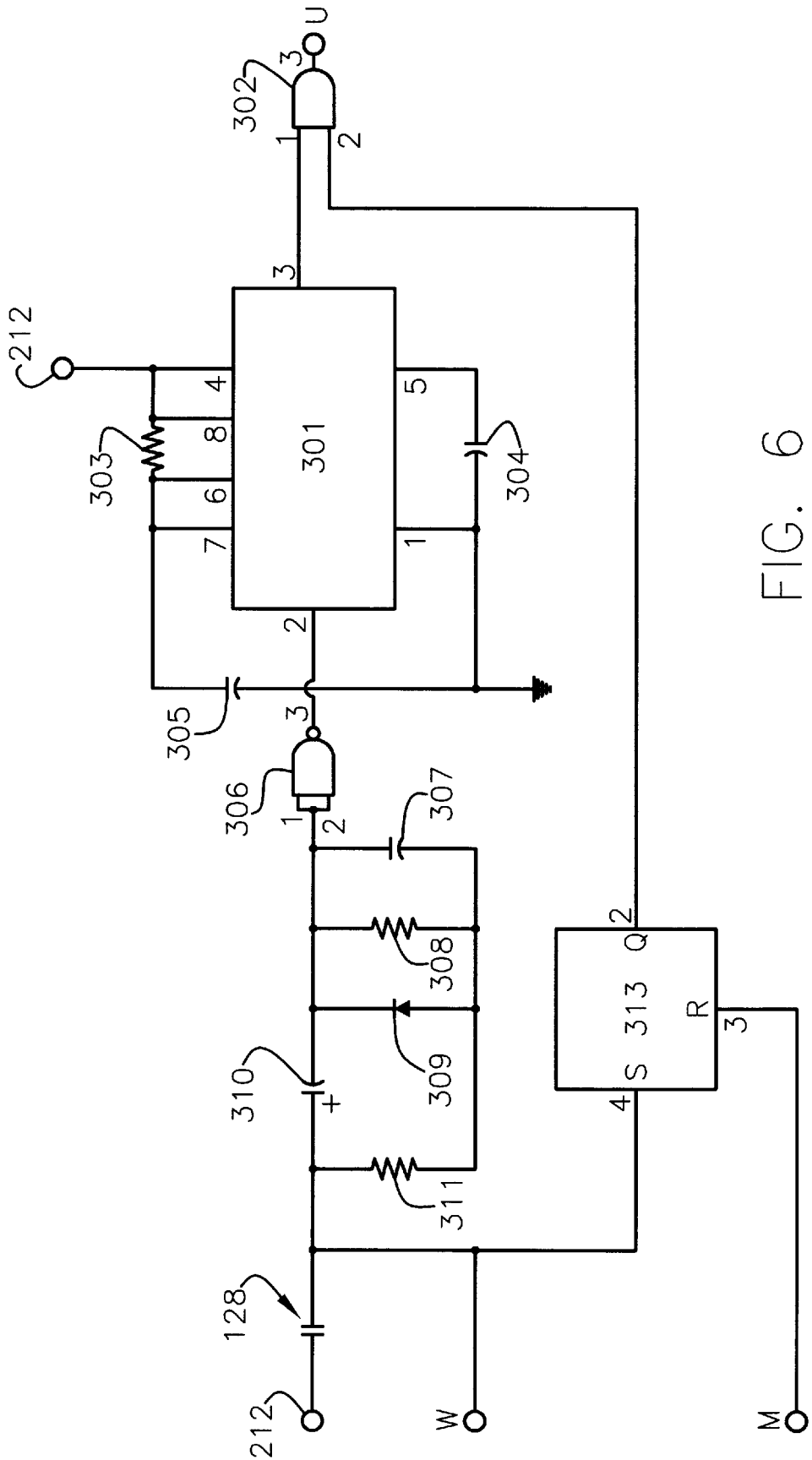
FIG. 6 is a circuit diagram of the timer enabling circuit of the electric permanent chuck controller described herein.

Timer 301 shown in FIG. 6 times out 0.27 seconds after it started timing. Its pin 3 becomes logic LOW, disabling AND gates 302, 405, and 406. No more pulses appear at the gates of the SCRs and current flow to the coils of the electric permanent chuck stops.

When pin 3 of NAND gate 196 (shown in FIG. 4) became LOW as stated above, pin 5 of NOR gate 515 (FIG. 8) also became LOW via terminal A. When current flow to the magnetic chuck is sensed by the current transformer 35, pin 6 of comparator 508 becomes LOW. This causes the output of NOR gate 515 to become HIGH, which sets S/R gate 518, making its output logic HIGH. Pin 10 of AND gate 534 and pin 10 of OR gate 536 become logic HIGH, turning on transistor 540 (collector pin 8) and putting a LOW on terminal 109. The red RELEASE lamp is illuminated to indicate that the electric permanent chuck is completely deenergized. If insufficient current is sensed by the current sensing transformer 35, pin 9 of OR gate 536 will remain LOW. Ripple counter divider 532 output pin 6 is constantly oscillating. This oscillating logic appears at pin 8 of OR gate 536 through AND gate 533. Therefore, pin 10 of 536 is also oscillating, causing the RELEASE lamp to blink to alert the operator of insufficient current to the electric permanent chuck coils during the RELEASE mode. Relay 545 is automatically de-energized during the RELEASE mode to signal the other machine functions that the RELEASE mode has been activated.

Control Circuit for Multiple Step-Down Release

A first alternative embodiment of the control includes a VARIABLE CHARGE and RELEASE step-down circuitry to incrementally remove residual magnetic charge in a work piece. The control circuit is identical to single step control circuit with the substitution of FIG. 13 for FIG. 12 and FIG. 29 for FIG. 9, and the addition of FIG. 28. This embodiment is suitably adapted for controlling an electric permanent chuck to be used in machining applications such as with a surface grinder. However, these features can be utilized in other applications, such as milling, as well. The CHARGE mode of the circuit operates in precisely the same manner as the single step release control circuit described above, the only difference being the variable charge setting. As shown in FIG. 13, when the VARIABLE CHARGE switch 114 is enabled, the 12 Volt DC signal from the output of voltage regulator 212 is routed through potentiometer 104. This voltage is applied through terminal 116 to pin 22 of IC 216. Depending of the setting of the variable charge potentiometer 104, the phase of the trigger pulses will be affected. When the variable charge potentiometer 104 is fully turned clockwise, about 12 volts DC goes to pin 22 of IC 216, producing a series of trigger pulses depicted in FIG. 17b. As the potentiometer is turned counter-clockwise, the voltage at pin 22 of 216 decreases. The phase of the trigger pulses will increase because it takes longer to charge capacitor 218 as explained above.

FIGS. 26a–c show the pulses on pulse transformer 401 and 402, which triggers SCRs 28a and 40a respectively. The shaded portion of the AC line current depicts the portion of the current applied to the chuck 1. Once a trigger pulse is applied to the gate of an SCR, the SCR will remain on for the remainder of that half-cycle as shown by the shaded portion. If the trigger pulse appears on the latter portion of the half-cycle, the SCR will conduct from that point up to the next zero crossing. Thus, the less voltage applied to pin 22 of IC 216, the later during the half-cycle of the AC source 22 the trigger pulses appear. This causes SCRs 28a and 40a to rectify only a small portion of the half-cycle of the AC source 22, applying less average current through the electric permanent chuck 1.

Figure 28:
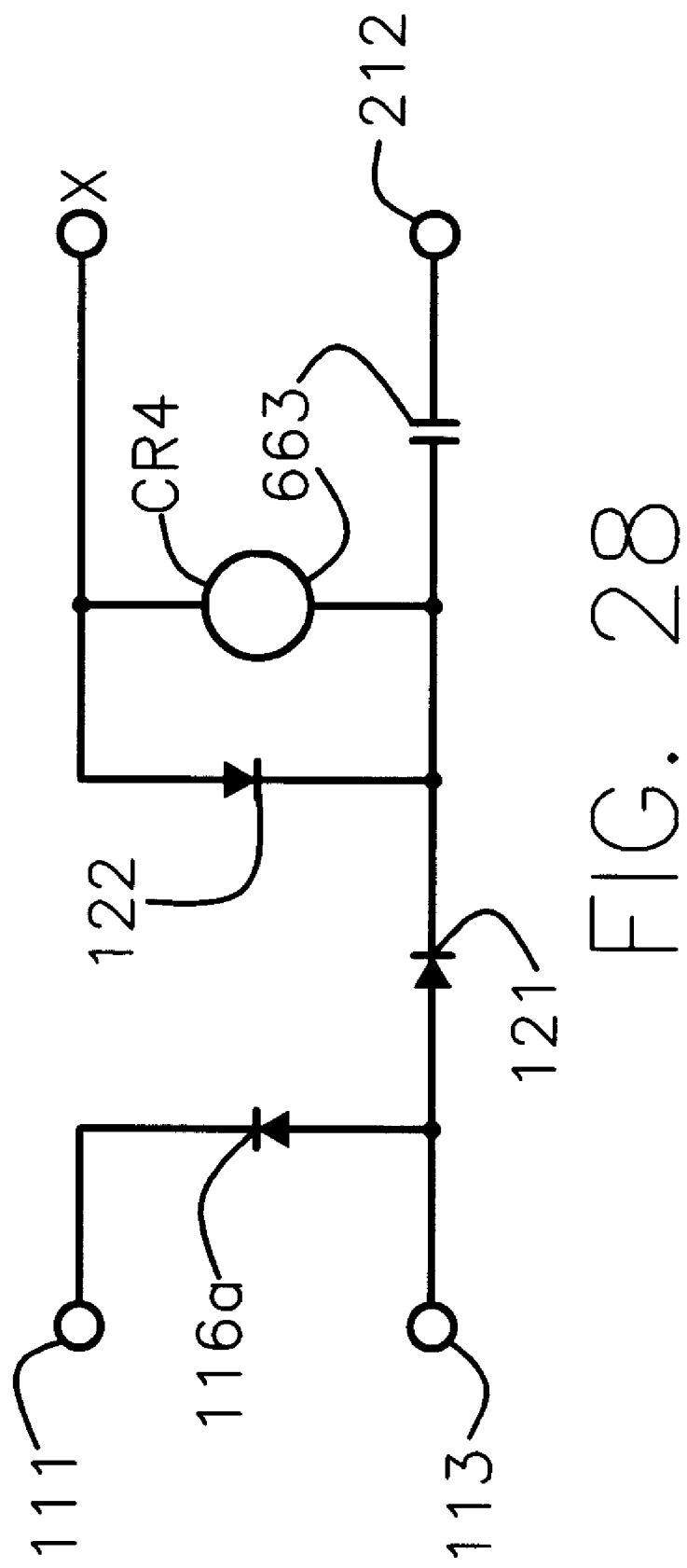
FIG. 28 is a circuit diagram of a circuit utilized in the CHARGE/RELEASE/VARIABLE CHARGE selector circuit described herein.
Figure 29:
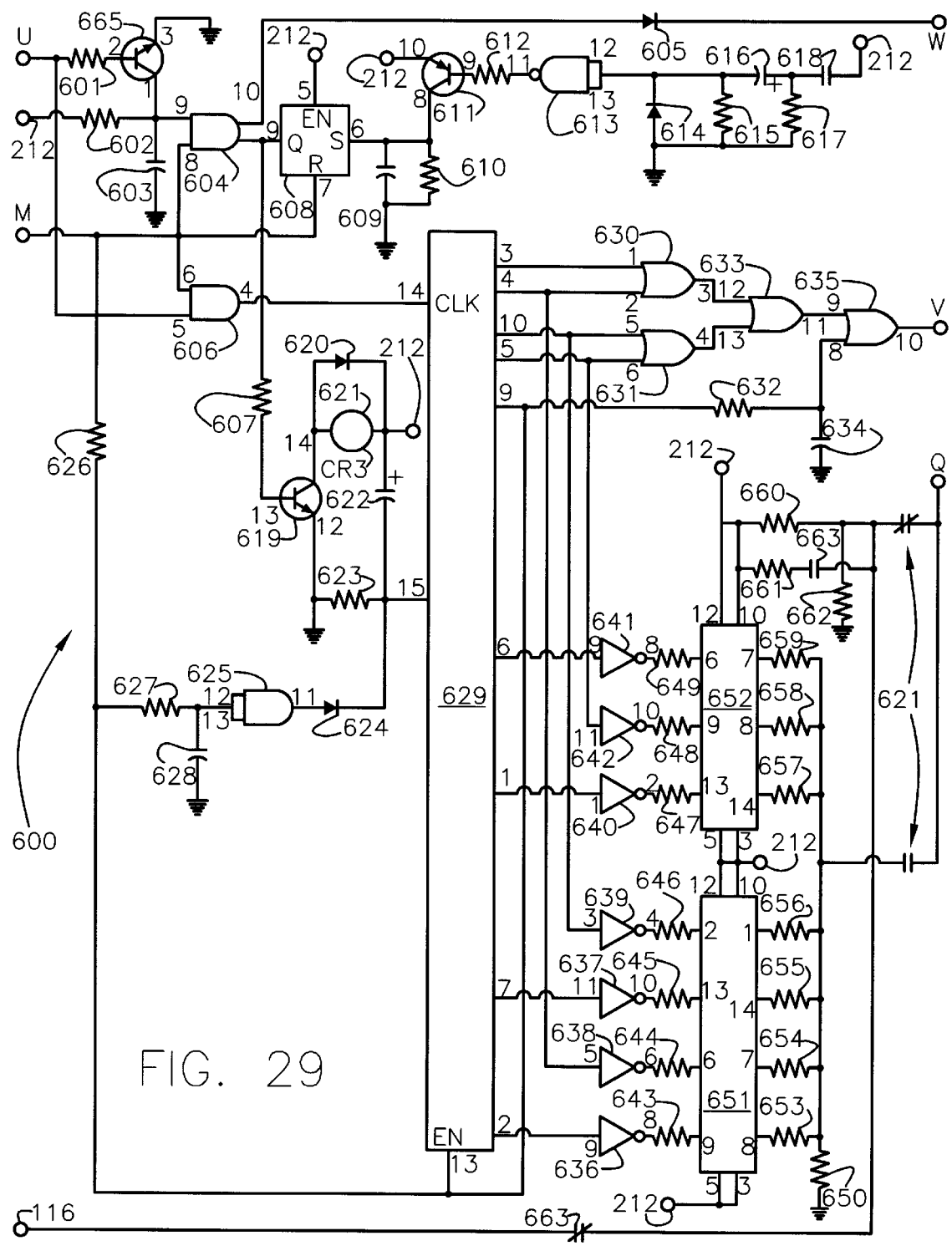
FIG. 29 is a circuit diagram of an alternative to the RELEASE/step-down circuit shown in FIG. 9.

FIG. 13 and FIG. 28 (as an addition to the circuit shown in FIG. 4) depict the alternative CHARGE/RELEASE selector circuit utilized in the grinding embodiment. When the FULL/VARIABLE switch 114 (as shown in FIG. 13) is set in the FULL position and the CHARGE/RELEASE switch 101 is set on CHARGE, this places a HIGH on terminal 113 and energizes control relay 663 through diode 121. The normally closed contacts of relay 663 will open (as shown in FIG. 29), breaking the connection to potentiometer 104 through terminal 116. The other normally open contacts of relay 663 will close, connecting about 12 Volts DC to pin 22 of IC 216 through resistor 661.

Figure 7:
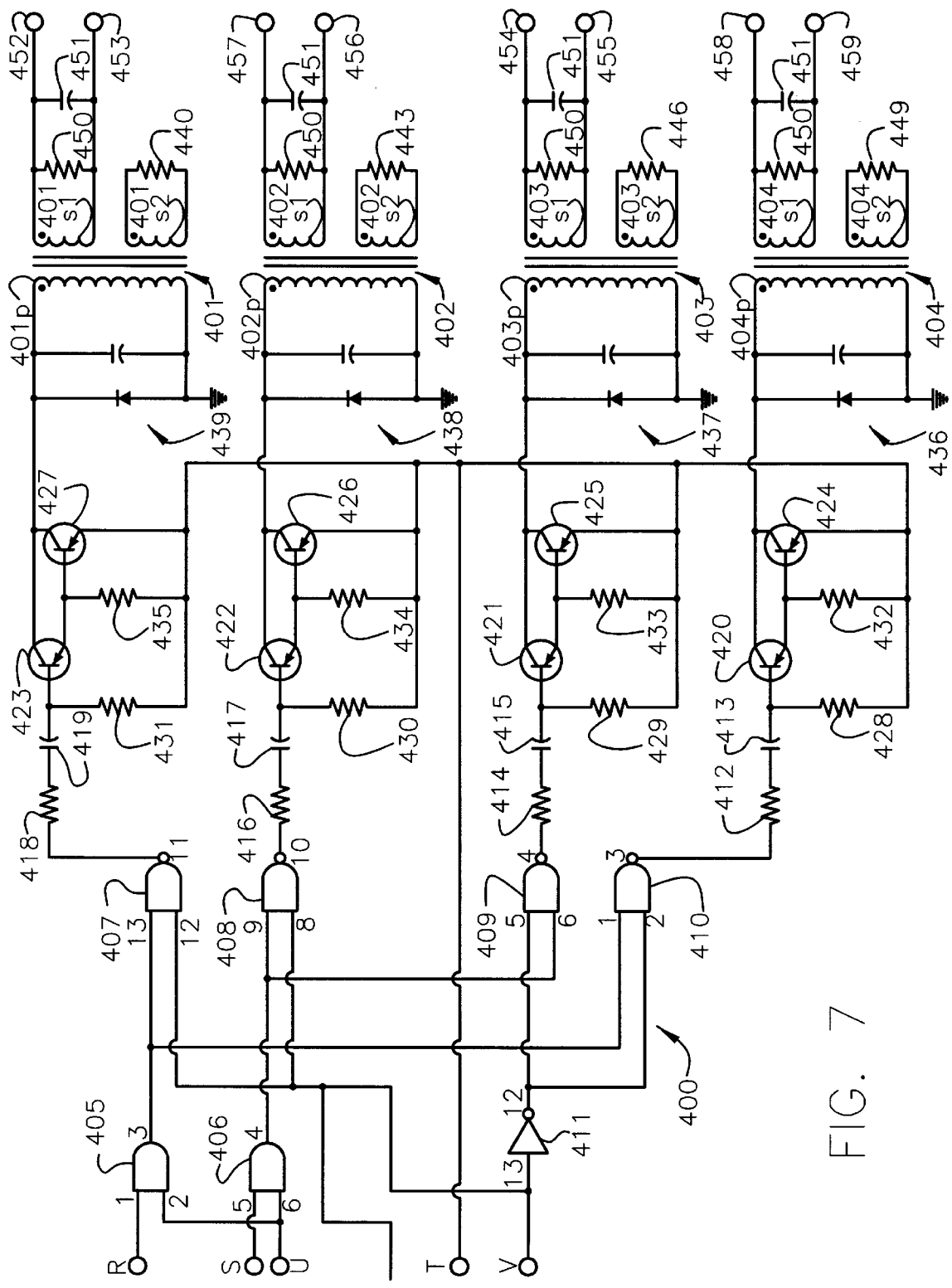
FIG. 7 is a circuit diagram of the SCR trigger circuit of the electric permanent chuck controller described herein.

The RELEASE mode of this alternative embodiment is triggered by setting the CHARGE/RELEASE switch 101 to the RELEASE position (as shown in FIG. 13). As in the previous embodiment, AND gates 405 and 406 become enabled for approximately 0.27 seconds via timer 301 and the pulses are applied to pulse transformers 403 and 404. The secondaries of these transformer are induced and reflect the same trigger pulses at the gates of SCRs 28b and 40b. Because SCRs 28b and 40b are configured in opposite directions to SCRs 28a and 40a, the current through each set of coils 2 and 3 is applied in a direction opposite to that used during the CHARGE mode. This removes the magnetic charge from the electric permanent chuck 1. However, a residual charge may remain in the workpiece. To remove this charge to enable to workpiece to be manually manipulated, a release step-down circuit 600a, as shown in FIG. 29, is utilized to apply a series oppositely directed currents through the coils of the electromagnetic chuck. Once pin 3 of 302 goes logic LOW, terminal U becomes LOW. Accordingly, transistor 665 in FIG. 29 is disabled and capacitor 603 begins to charge through resistor 602. After about 30 milliseconds, the charge on capacitor 603 reaches a certain value where the output of AND gate 604 changes to HIGH. This signal goes through diode 605 and gives a HIGH pulse on pins 1 and 2 of NAND gates 306 in the timer enabling circuit shown in FIG. 6, triggering timer 301. Pin 3 of timer 301 becomes HIGH, triggering AND gate 302 and enabling gates 405 and 406. Pin 4 of AND gate 606 shown in FIG. 29 becomes HIGH and applies this signal to the clock input pin 14 of decade counter divider 629. The outputs of the decade counter 629 advanced one step. Pin 4 of the decade counter 629 becomes HIGH, while the other outputs turn LOW. Pin 10 of OR gate 635 becomes HIGH, enabling NAND gates 407 and 408 as shown in FIG. 7. Pin 12 of inverter 411 becomes LOW, disabling NAND gates 409 and 410.

When pin 4 of counter 629 becomes high as depicted in FIG. 29, pin 6 of inverter 638 turns LOW. Pin 7 of transistor bank 651 becomes HIGH. Through resistor network 650 and 654, about 9.2 volts is applied to pin 22 of IC 216. This causes capacitor 218 to charge a little bit slower and the trigger pulses appear about 0.8 milliseconds later compared to the previous pulses. SCRs 28a and 40a are turned on at each trigger pulse until the next zero crossing of the AC line current. The current to the magnetic chuck coils 2 and 3 is reversed once again from the previous one and also at a lower value. This means that the magnetic field is now opposite from the previous field, but at a lower lever.

The cycle is repeated several times with a total of 7 polarity reversals, each one triggering the SCRs at a time later in the phase of the half wave of AC current, and each one communicated less current to the coils of the electric permanent chuck 1. FIGS. 17b to 17h illustrate the positions of the trigger pulses as the controller goes through the RELEASE cycle. The total RELEASE cycle time is about 2.1 seconds. After completed, the work piece on the electric permanent chuck can easily be removed.

Control Circuit for Multi-Chuck Operation

To operate the multi-chuck controller, as depicted in FIGS. 3, 14 and 15, the operator must first select which chuck to operate. As shown in FIG. 14, the operator can choose from any one of three chucks by utilizing switch 807. It is to be understood, however, that more chucks can be added to the multi-chuck configuration. The operator next turns the CHARGE/RELEASE switch 101 to CHARGE. This causes relay 804 to latch in. Contactor 154a will energize for a few seconds. The actual charging of the electric permanent chuck selected 1a will proceed precisely as described above. When current through the magnetic chuck is sensed by the circuitry (as described above), relay 545 will energize. Through the normally open contacts of relays 545 and 804, relay 808a will latch in. The set one indicator lamp 801 becomes illuminated to indicate that set 1 is fully magnetized. The green charge lamp 107 is also illuminated by the process described previously. Contactor 154a will drop out after a few seconds. The operator can now select another set of magnetic chuck(s) if needed. The same sequence is then applied to the other chucks.

To initiate a release, the chuck selector switch is set to the appropriate chuck to be demagnetized. The operator activates the RELEASE switch 101. Relay 804 will then unlatch. Contactor 154A will energize for a few seconds. The release current is applied as described above depending on whether the single step or multiple step-down release control circuit configuration is utilized. Relay 545 will energize as current is applied to the chuck. Through its normally open contacts and the normally closed contacts of relay 804, 808a will reset, turning off indicator lamp 801. In addition, the amber release lamp 106 will be illuminated by the process described more fully above. Contactor 154a them de-energizes and the operator is free to select another chuck.

The following is a list of resistor and capacitor values utilized in the embodiments described herein:
Capacitors
    0.01 mF, 600V: 239, 263
    0.01 mF, 100V: 219, 237, 259
    0.015 mF, 200V: 413, 415, 417, 419
    0.1 mF, 800V: 41a, 42a
    0.1 mF, 200V: 250
    0.1 mF, 50V: 124, 218, 264, 304, 307, 436, 437, 438, 439, 609, 634
    0.22 mF, 50V, 529
    0.25 mF, 600V: 157
    1.0 mF, 50V: 133, 174, 180, 195, 305, 442, 445, 448, 451, 521, 522, 603
    3.3 mF, 50V: 622, 701
    10.0 mF, 16V: 172, 186, 190, 310, 616, 628
    10.0 mF, 50V: 139
    25 mF, 25V: 209, 210, 260
    220 mF, 25V: 268
    220 mF, 35V: 205, 206
    470 mF, 25V: 503
Inductors
    100 mH: 211
Resistors
    47 ohms: 158
    56 ohms, 1 W: 501
    100 ohm, 20 W: 41b, 42b
    100 ohm: 440, 441, 443, 444, 446, 447, 449, 450, 504
    500 ohm, 20 W: 45, 46
    680 ohms: 126, 136, 152, 244, 248, 513, 542
    1K ohms, 20 W: 155
    1K ohms: 432, 433, 434, 435
    2.4K ohms: 653
    3K ohms: 214
    3.9K ohms: 654
    4.7K ohms: 238, 243, 247, 258, 412, 414, 416, 418, 505, 507, 530
    5K ohms (potentiometer): 104, 506
    5.6K ohms: 118
    6.2K ohms: 215
    6.8K ohms: 660
    7.5K ohms: 661
    8.2K ohms: 117a, 655
    10K ohms: 119, 120, 125, 131, 142, 148, 150, 159, 160, 161, 162, 163, 165, 166, 168, 170, 175, 176, 178, 179, 184, 185, 188, 197, 252, 253, 255, 257, 311, 428, 429, 430, 431, 511, 519, 520, 526, 538, 539, 547, 601, 607, 610, 612, 615, 617, 623, 626, 632, 643, 644, 645, 646, 647, 648, 649, 650, 662, 704, 809, 811
    15K ohms: 656
    20K ohms: 265
    22K ohms: 657
    39K ohms: 658
    43K ohms: 266, 602
    50K ohms (thermister): 224
    62K ohms: 267
    68K ohms: 659
    100K ohms: 225, 256, 627, 702
    120K ohms: 223, 531
    200K ohms: 303
    220K ohms: 140, 220, 220, 509
    390K ohms: 134, 194
    560K ohms: 191
    Varistor, model number V33ZA1: 251

What is claimed is:

1. A method of operating an electric permanent chuck comprising the steps of: supplying an alternating current having no more than a single selected frequency and phase from an alternating current source;

generating electrical pulses at a frequency equivalent to a multiple of the frequency of the alternating current, the electrical pulses having a predetermined phase relative to the phase of the alternating current;

providing an electric permanent chuck having at least one pair of adjacent magnetic coils that are oriented such that the coils within each pair are magnetized by current flow in opposite directions through each respective coil;

providing at least one pair of magnetizing SCRs, wherein one magnetizing SCR within each pair is electrically connected to one of the respective magnetic coils within an adjacent pair of magnetic coils and the other magnetizing SCR within each pair is electrically connected to the other of the respective magnetic coils within an adjacent pair of magnetic coils, wherein each magnetizing SCR within each pair has a gate to control communication between each respective magnetic coil and the alternating current source in response to the electrical pulses, and wherein each magnetizing SCR within each pair is configured to allow current to flow in a magnetizing direction through the magnetic coil to which it is connected; and transmitting a number of electrical pulses to the gate of each pair of magnetizing SCRs, each pulse enabling the magnetizing SCR to which the pulse is transmitted to communicate a charge from the alternating current source to each respective magnetic coil to which the magnetizing SCR is electrically connected to magnetize the respective magnetic coil within the electric permanent chuck, the magnitude of the charge communicated by the magnetizing SCR due to each pulse being a function of the difference in phase between the electrical pulses and the alternating current and the total of all charges communicated to each respective magnetic coil being a function of the number of pulses transmitted to the gate of the magnetizing SCR.

2. The method of claim 1 further comprising the steps of:

sensing the current from the alternating current source to the electric permanent chuck; and activating a charge indicator when sufficient current has been communicated from the alternating current source to the electric permanent chuck to magnetize fully the electric permanent chuck.

3. The method of claim 2 further comprising the step of providing a signal indicating that the electric permanent chuck is fully magnetized.

4. The method of claim 2 further comprising the step of activating an insufficient charge indicator when insufficient current has been communicated from the alternating current source to the electric permanent chuck to magnetize fully the electric permanent chuck.

5. The method of claim 1 wherein the step of supplying alternating current further includes:

providing a switching circuit to supply selectively the alternating current to each magnetizing SCR.

6. The method of claim 1 further comprising the step of:

adjusting the phase of the electrical pulses relative to the phase of the alternating current.

7. The method of claim 1 wherein the step of transmitting a number of the electrical pulses includes identifying a predetermined period of time in which the electrical pulses are to be transmitted to the gate of each magnetizing SCR.

8. The method of claim 7 wherein the predetermined period of time is 0.27 seconds.

9. The method of claim 1 wherein a plurality of electric permanent chucks are to be operated, the step of providing at least one magnetizing SCR including providing at least one magnetizing SCR electrically connected to at least one magnetic coil in a respective one of the plurality of electric permanent chucks.

10. The method of claim 9 comprising the additional step of:

selecting at least one magnetizing SCR to be enabled by the transmitted electrical pulses so as to operate selectively a respective one of the electric permanent chucks.

11. The method of claim 1 wherein the electric permanent chuck includes a plurality of magnetic coils in side-by-side relationship, the step of providing at least one magnetizing SCR including providing a plurality of magnetizing SCRS, each magnetizing SCR electrically connected to a respective one of the plurality of magnetic coils so as to direct current flow in opposite directions through adjacent magnetic coils within the electric permanent chuck when the magnetizing SCRs are enabled.

12. The method of claim 1 comprising the additional steps of:

providing at least one demagnetizing SCR, each demagnetizing SCR corresponding to a magnetizing SCR and being electrically connected to each respective magnetic coil within the electric permanent chuck, and each demagnetizing SCR having a gate to control communication between each respective magnetic coil and the alternating current source so as to direct current flow through each respective magnetic coil in a direction opposite to the direction of current flow through each respective magnetic coil utilized to magnetize the electric permanent chuck; and transmitting a number of the electrical pulses to the gate of at least one demagnetizing SCR, each pulse enabling the demagnetizing SCR to which the pulse is transmitted to communicate a charge from the alternating current source to each respective magnetic coil to demagnetize the electric permanent chuck, the magnitude of the charge communicated by the demagnetizing SCR due to each pulse being a function of the difference in phase between the electrical pulses and the alternating current, and the total of all charges communicated to each respective magnetic coil being a function of the number of pulses transmitted to the gate of the demagnetizing SCR.

13. A method of demagnetizing an electric permanent chuck having at least one pair of adjacent magnetic coils through which current flow has been directed to magnetize the respective coils within the electric permanent chuck, wherein the magnetic coils are oriented such that the coils within each pair are magnetized by current flow in opposite directions through each respective coil, the method comprising the steps of:

supplying an alternating current having no more than a single selected frequency and phase from an alternating current source;

generating electrical pulses at a frequency equivalent to a multiple of the frequency of the alternating current, the electrical pulses having a predetermined phase relative to the phase of the alternating current;

providing at least one pair of demagnetizing SCRs, wherein one demagnetizing SCR within each pair is electrically connected to one of the respective magnetic coils within an adjacent pair of magnetic coils and the other demagnetizing SCR within each pair is electrically connected to the other of the respective magnetic coils within an adjacent pair of magnetic coils, and wherein each demagnetizing SCR within each pair has a gate to control communication between each respective magnetic coil and the alternating current source so as to direct current flow through each respective magnetic coil in a direction opposite to the direction of current flow utilized to magnetize the respective magnetic coil within the electric permanent chuck; and transmitting a number of electrical pulses to the gate of each pair of demagnetizing SCRs, each pulse enabling the demagnetizing SCR to which the pulse is transmitted to communicate a charge from the alternating current source to each respective magnetic coil to which the magnetizing SCR is electrically connected to demagnetize the respective magnetic coil within the electric permanent chuck, the magnitude of the charge communicated by the demagnetizing SCR due to each pulse being a function of the difference in phase between the electrical pulses and the alternating current and the total of all charges communicated to each respective magnetic coil being a function of the number of pulses transmitted to the gate of the magnetizing SCR.

14. The method of claim 13 further comprising the steps of:

sensing the current from the alternating current source to the electric permanent chuck; and activating a release indicator when sufficient current has been communicated from the alternating current source to the electric permanent chuck to demagnetize fully the electric permanent chuck.

15. The method of claim 14 further comprising the step of providing a signal indicating that the electric permanent chuck is fully demagnetized.

16. The method of claim 14 further comprising the step of activating an insufficient release indicator when insufficient current has been communicated from the alternating current source to the electric permanent chuck to demagnetize fully the electric permanent chuck.

17. The method of claim 13 wherein the step of supplying alternating current further includes:

providing a switching circuit to supply selectively the alternating current to each demagnetizing SCR.

18. The method of claim 13 further comprising the step of:

adjusting the phase of the electrical pulses relative to the phase of the alternating current.

19. The method of claim 13 wherein the step of transmitting a number of the electrical pulses includes identifying a predetermined period of time in which the electrical pulses are to be transmitted to the gate of each demagnetizing SCR.

20. The method of claim 19 wherein the predetermined period of time is 0.27 seconds.

21. The method of claim 13 wherein a plurality of electric permanent chucks are to be operated, the step of providing at least one demagnetizing SCR including providing at least one demagnetizing SCR electrically connected to at least one magnetic coil within a respective one of the plurality of electric permanent chucks.

22. The method of claim 21 comprising the additional step of:

selecting at least one demagnetizing SCR to be enabled by the transmitted electrical pulses so at to operate selectively a respective one the respective electric permanent chucks.

23. The method of claim 13 wherein the electric permanent chuck includes a plurality of magnetic coils in side-by-side relationship, the step of providing at least one demagnetizing SCR including providing a plurality of demagnetizing SCRS, each demagnetizing SCR electrically connected to a respective one of the plurality of magnetic coils so as to direct current flow in opposite directions through adjacent magnetic coils within the electric permanent chuck when the demagnetizing SCRs are enabled.

24. The method of claim 13 further comprising the steps of:

providing at least one magnetizing SCR, each magnetizing SCR corresponding to a demagnetizing SCR and being electrically connected to each respective magnetic coil within the electric permanent chuck, and each magnetizing SCR having a gate to control communication between each respective magnetic coil and the alternating current source so as to direct current flow through each respective magnetic coil in a direction opposite to the direction of current flow through each respective magnetic coil utilized to demagnetize the electric permanent chuck;

increasing the phase between the electrical pulses and the alternating current so that the electrical pulses occur a predetermined amount later in time than the previous set of electrical pulses with respect to the beginning of a half-wave of the alternating current, but with a difference in phase between the electrical pulses and the alternating current of less than 180°;

transmitting a number of the electrical pulses to the gate of at least one magnetizing SCR, each pulse enabling the magnetizing SCR to which the pulse is transmitted to communicate a charge from the alternating current source to each respective magnetic coil to magnetize the electric permanent chuck, the magnitude of the communicated charge communicated by the magnetizing SCR due to each pulse being a function of the difference in phase between the electrical pulses and the alternating current and the total of all charges communicated to each respective magnetic coil being a function of the number of pulses provided to the gate of the magnetizing SCR.

increasing the phase between the electrical pulses and the alternating current so that the electrical pulses occur a predetermined amount later in time than the previous set of electrical pulses with respect to the beginning of a half-wave of the alternating current, but with a difference in phase between the electrical pulses and the alternating current of less than 180°;

transmitting a number of the electrical pulses to the gate of each demagnetizing SCR, each pulse enabling the demagnetizing SCR to which the pulse is transmitted to communicate a charge from the alternating current source to each respective magnetic coil to demagnetize the electric permanent chuck, the magnitude of the charge communicated by the demagnetizing SCR due to each pulse being a function of the difference in phase between the electrical pulses and the alternating current, and the total of all charges communicated to each respective magnetic coil being a function of the number of pulses provided to the gate of the demagnetizing SCR.

25. The method of claim 24 further comprising the steps of repeating the pair of increasing and transmitting steps of claim 24.

26. A controller for an electric permanent chuck containing at least one pair of adjacent magnetic coils that are oriented such that the coils within each pair are magnetized by current flow in opposite directions through each respective coil, the controller comprising:

a single phase two-line alternating current source to supply current at a selected frequency;

an electrical pulse generating circuit in communication with the alternating current source to generate electrical pulses at a frequency equivalent to a multiple of the frequency of the alternating current, the electrical pulses having a predetermined phase relative to the phase of the alternating current;

at least one pair of magnetizing SCRs in communication with the alternating current source, wherein each magnetizing SCR within each pair is in communication with a respective magnetic coil within at least one adjacent pair of magnetic coils within the electric permanent chuck, wherein each magnetizing SCR within each pair has a gate in communication with the electrical pulse generating circuit, the gate controlling communication between the alternating current source and each respective magnetic coil in response to the electrical pulses, and wherein each magnetizing SCR within each pair is configured to allow current to flow in a magnetizing direction through the magnetic coil to which it is connected; and a transmission regulating circuit in communication with the electrical pulse generating circuit and the gate of each magnetizing SCR to allow the transmission of a number of the electrical pulses.

27. The controller of claim 26 further comprising:

a current sensing transformer in communication with the alternating current source to sense the alternating current communicated to the electric permanent chuck; and a charge indicator in communication with the current sensing transformer to indicate when sufficient current has been communicated to the electric permanent chuck to magnetize fully the electric permanent chuck.

28. The controller of claim 27 wherein the charge indicator includes an electrical circuit to activate an insufficient charge signal when insufficient current has been communicated to the electric permanent chuck to magnetize fully the electric permanent chuck.

29. The controller of claim 26 further comprising an electrical switching circuit to supply selectively the alternating current to each magnetizing SCR.

30. The controller of claim 26 further comprising;

a phase adjusting electrical circuit in communication with the electrical pulse generating circuit to adjust the phase of the electrical pulses relative to the phase of the alternating current.

31. The controller of claim 26 wherein the transmission regulating circuit includes an electronic timing circuit to allow the transmission of a number of the electrical pulses to the gate of each magnetizing SCR for a predetermined period of time.

32. The controller of claim 31 wherein the predetermined period of time is 0.27 seconds.

33. The controller of claim 26, wherein the controller is capable of controlling a plurality of electric permanent chucks, the controller further comprising at least one magnetizing SCRs, each magnetizing SCR being in communication with at least one magnetic coil in a respective one of the plurality of electric permanent chucks.

34. The controller of claim 33 further comprising:

an electrical switching circuit to select at least one magnetizing SCR to be enabled by the electrical pulses so as to operate selectively a respective one of the electric permanent chucks.

35. The controller of claim 26 wherein the electric permanent chuck includes a plurality of magnetic coils in side-by-side relationship, and further comprising a plurality of magnetizing SCRs, each magnetizing SCR being in communication with a respective one of the plurality of magnetic coils so as to direct current flow in opposite directions through adjacent magnetic coils within the electric permanent chuck when the magnetizing SCRs are enabled.

36. The controller of claim 26 further comprising:

at least one demagnetizing SCR corresponding to each magnetizing SCR, each demagnetizing SCR being in communication with the alternating current source and the respective magnetic coil within the electric permanent chuck, and each demagnetizing SCR having a gate to control communication between the alternating current source and each respective magnetic coil so as to direct current flow through the respective magnetic coil in a direction opposite to the direction of current flow through the respective magnetic coil utilized to magnetize the electric permanent chuck.

37. A controller for demagnetizing an electric permanent chuck having at least one pair of adjacent magnetic coils that are oriented such that the coils within each pair are magnetized by current flow in opposite directions through each respective coil through which a current flow has been directed to magnetize the respective magnetic coils, comprising:

a single phase two-line alternating current source to supply current at a selected frequency;

an electrical pulse generating circuit in communication with the alternating current source to generate electrical pulses at a frequency equivalent to a multiple of the frequency of the alternating current, the electrical pulses having a predetermined phase relative to the phase of the alternating current;

at least one pair of demagnetizing SCRs in communication with the alternating current source, wherein each demagnetizing SCR within each pair is in communication with a respective magnetic coil within at least one adjacent pair of magnetic coils within the electric permanent chuck, wherein each demagnetizing SCR within each pair has a gate in communication with the electrical pulse generating circuit, the gate controlling communication between the alternating current source and each respective magnetic coil in response to the electrical pulses so as to direct current flow through each respective magnetic coil in a direction opposite to the direction of the current flow utilized to magnetize the respective magnetic coil within the electric permanent chuck; and a transmission regulating circuit in communication with the electrical pulse generating circuit and the gate of each demagnetizing SCR to allow the transmission of a number of the electrical pulses.

38. The controller of claim 37 further comprising:

a current sensing transformer in communication with the alternating current source to sense the alternating current communicated to the electric permanent chuck; and a release indicator in communication with the current sensing transformer to indicate when sufficient current has been communicated to the electric permanent chuck to demagnetize fully the electric permanent chuck.

39. The controller of claim 38 wherein the release indicator includes an electrical circuit to activate an insufficient charge signal when insufficient current has been communicated to the electric permanent chuck to demagnetize fully the electric permanent chuck.

40. The controller of claim 37 further comprising a electrical switching circuit to supply selectively the alternating current to each demagnetizing SCR.

41. The controller of claim 37 further comprising:
a phase adjusting electrical circuit in communication with the electrical pulse generating circuit to adjust the phase of the electrical pulses relative to the phase of the alternating current.

42. The controller of claim 37 wherein the transmission regulating circuit includes an electronic timing circuit in communication with the electrical pulse generating circuit to allow the transmission of a number of the electrical pulses to the gate of each demagnetizing SCR for a predetermined period of time.

43. The controller of claim 42 wherein the predetermined period of time is 0.27 seconds.

44. The controller of claim 37, wherein the controller is capable of demagnetizing a plurality of electric permanent chucks, the controller further comprising at least one demagnetizing SCRs, each demagnetizing SCR being in communication with at least one magnetic coil in a respective one of the plurality of electric permanent chucks.

45. The controller claim 44 further comprising:
an electrical switching circuit to select at least one demagnetizing SCR to be enabled by the electrical pulses so as to operate selectively a respective one of the electric permanent chucks.

46. The controller of claim 37 wherein the electric permanent chuck includes a plurality of magnetic coils in side-by-side relationship, and further comprising a plurality of demagnetizing SCRs, each demagnetizing SCR being in communication with a respective one of the plurality of magnetic coils so as to direct current flow in opposite directions through adjacent magnetic coils within the electric permanent chuck when the demagnetizing SCRs are enabled.

47. The controller of claim 37 further comprising:
at least one magnetizing SCR corresponding to each demagnetizing SCR, each magnetizing SCR being in communication with the respective magnetic coil within the electric permanent chuck and the alternating current source, and each magnetizing SCR having a gate to control communication between the respective magnetic coil and the alternating current source so as to direct current flow through the respective magnetic coil in a direction opposite to the direction of current flow through the respective magnetic coil utilized to demagnetize the electric permanent chuck;

a phase adjusting electrical circuit in communication with the electrical pulse generating circuit to increase the phase of the electrical pulses relative to the phase of the alternating current by a predetermined amount less than 180°;

an electrical switching circuit in communication with the electronic pulse generating circuit and the gates of each of the magnetizing and demagnetizing SCRs to allow selective transmission of the electrical pulses to the gates of either the magnetizing or the demagnetizing SCRs for a predetermined period of time.

* * * * *